US011443009B2

(12) United States Patent
Yokota

(10) Patent No.: US 11,443,009 B2
(45) Date of Patent: Sep. 13, 2022

(54) INFORMATION PROCESSING SYSTEM, INFORMATION PROCESSING METHOD, PROGRAM, AND INFORMATION PROCESSING APPARATUS

(71) Applicant: Shun Yokota, Kanagawa (JP)

(72) Inventor: Shun Yokota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 157 days.

(21) Appl. No.: 16/802,813

(22) Filed: Feb. 27, 2020

(65) Prior Publication Data
US 2020/0279011 A1 Sep. 3, 2020

(30) Foreign Application Priority Data
Feb. 28, 2019 (JP) .............................. JP2019-036789

(51) Int. Cl.
*G06F 16/957* (2019.01)
*G06F 16/958* (2019.01)
(Continued)

(52) U.S. Cl.
CPC ........ *G06F 16/9577* (2019.01); *G06F 16/958* (2019.01); *G06F 40/117* (2020.01);
(Continued)

(58) Field of Classification Search
CPC .. G06F 16/957; G06F 16/9577; G06F 16/958; G06F 40/117; G06F 40/154;
(Continued)

(56) References Cited

U.S. PATENT DOCUMENTS 9,087,035 B1 * 7/2015 Bandaru ............... G06F 16/958
10,600,089 B2 * 3/2020 Fichter .................. G06F 16/958
(Continued)

FOREIGN PATENT DOCUMENTS

JP 2002-351783 12/2002
JP 2003-030318 1/2003
(Continued)

OTHER PUBLICATIONS

Mirjam Seckler et al: "Designing usable web forms", Human Factors in Computing Systems, ACM, 2 Penn Plaza, Suite 701 New York NY 10121-0701 USA, Apr. 26, 2014 (Apr. 26, 2014), pp. 1275-1284, XP058046796,DOI: 10.1145/2556288.2557265 ISBN: 978-1-4503-2473-1.
(Continued)

*Primary Examiner* — Chau T Nguyen
(74) *Attorney, Agent, or Firm* — IPUSA, PLLC

(57) ABSTRACT

An information processing system includes at least one information processing apparatus that communicate with a first service for supporting to create a home page and a second service for creating an analysis result by analyzing information related to browsing of the home page via a network, a home page information reception unit that receives home page configuration information concerning a configuration of the home page from the first service, an analysis result reception unit that receives an analysis result from the second service, an improvement information creation unit that creates improvement information for improving the home page based on the home page configuration information and the analysis result, and a communication unit that sends the improvement information created by the improvement information creation unit to a user terminal operated by a user.

15 Claims, 32 Drawing Sheets

(51) Int. Cl.
    *G06F 40/117*     (2020.01)
    *G06F 40/154*     (2020.01)
    *H04L 67/02*     (2022.01)
    *H04L 67/50*     (2022.01)
    *G06Q 30/02*     (2012.01)
    *G06Q 10/10*     (2012.01)

(52) U.S. Cl.
    CPC ....... *G06F 40/154* (2020.01); *G06Q 30/0242* (2013.01); *H04L 67/02* (2013.01); *H04L 67/535* (2022.05); *G06Q 10/10* (2013.01)

(58) Field of Classification Search
    CPC .... G06Q 10/10; G06Q 30/0242; H04L 67/02; H04L 67/22; H04L 67/535
    See application file for complete search history.

(56) References Cited

U.S. PATENT DOCUMENTS

| | | | | |
|---|---|---|---|---|
| 2011/0087966 | A1* | 4/2011 | Leviathan | G06F 16/9577 715/745 |
| 2013/0073382 | A1* | 3/2013 | Henkin | G06F 16/955 705/14.49 |
| 2013/0332440 | A1* | 12/2013 | Barad | G06F 16/957 707/706 |
| 2015/0120858 | A1* | 4/2015 | Anderson | H04L 67/22 709/213 |
| 2017/0063653 | A1* | 3/2017 | Kieviet | H04L 67/02 |
| 2017/0249395 | A1* | 8/2017 | Muller | G06F 16/9535 |
| 2020/0013074 | A1 | 1/2020 | Yokota | |
| 2020/0183553 | A1* | 6/2020 | Al-Sallami | G06F 40/143 |

FOREIGN PATENT DOCUMENTS

| | | |
|---|---|---|
| JP | 2007-102364 | 4/2007 |
| JP | 2012-039471 | 2/2012 |
| JP | 2017-122959 | 7/2017 |

OTHER PUBLICATIONS

Extended European Search Report for 20159858.8 dated Jul. 3, 2020.

\* cited by examiner

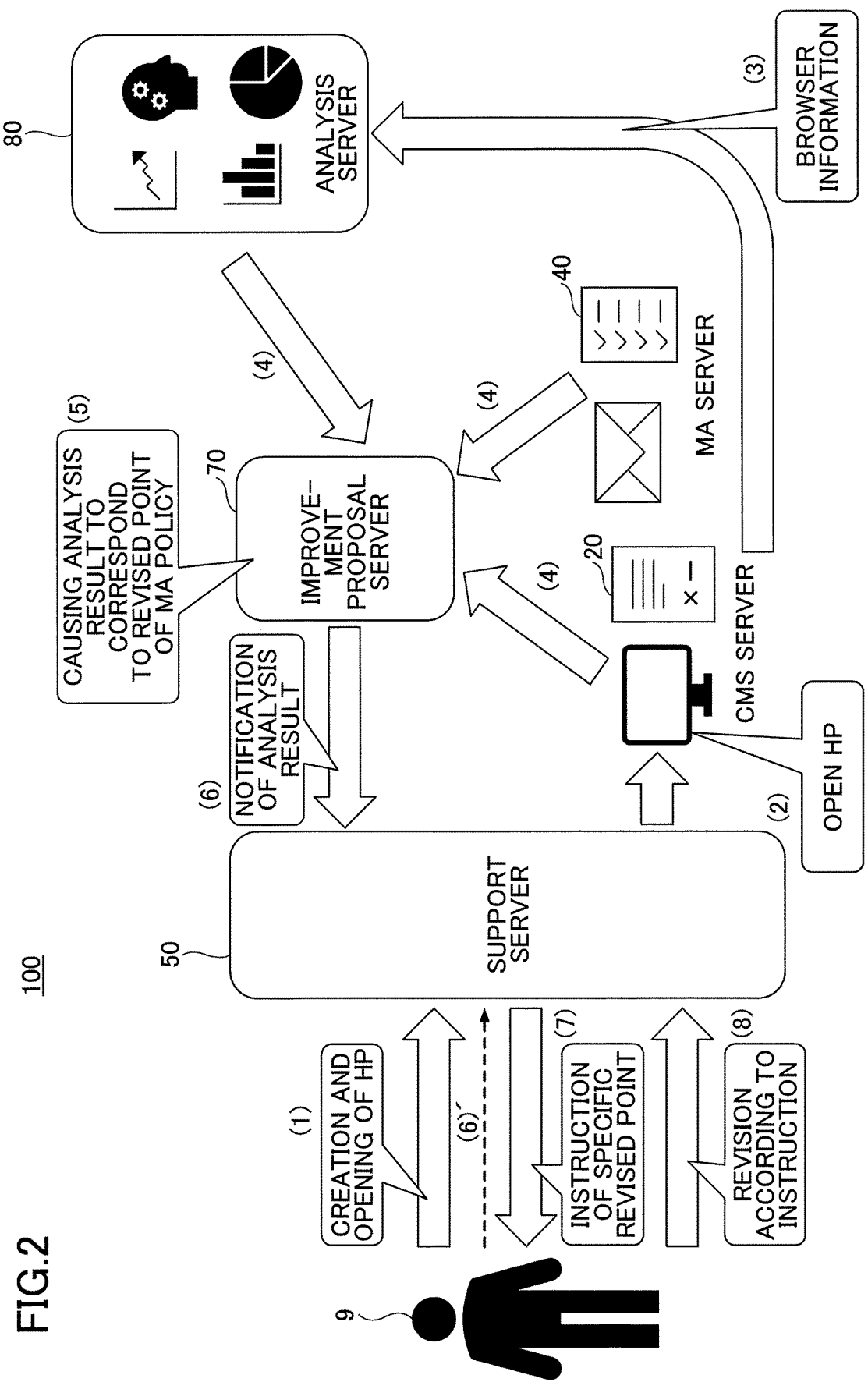

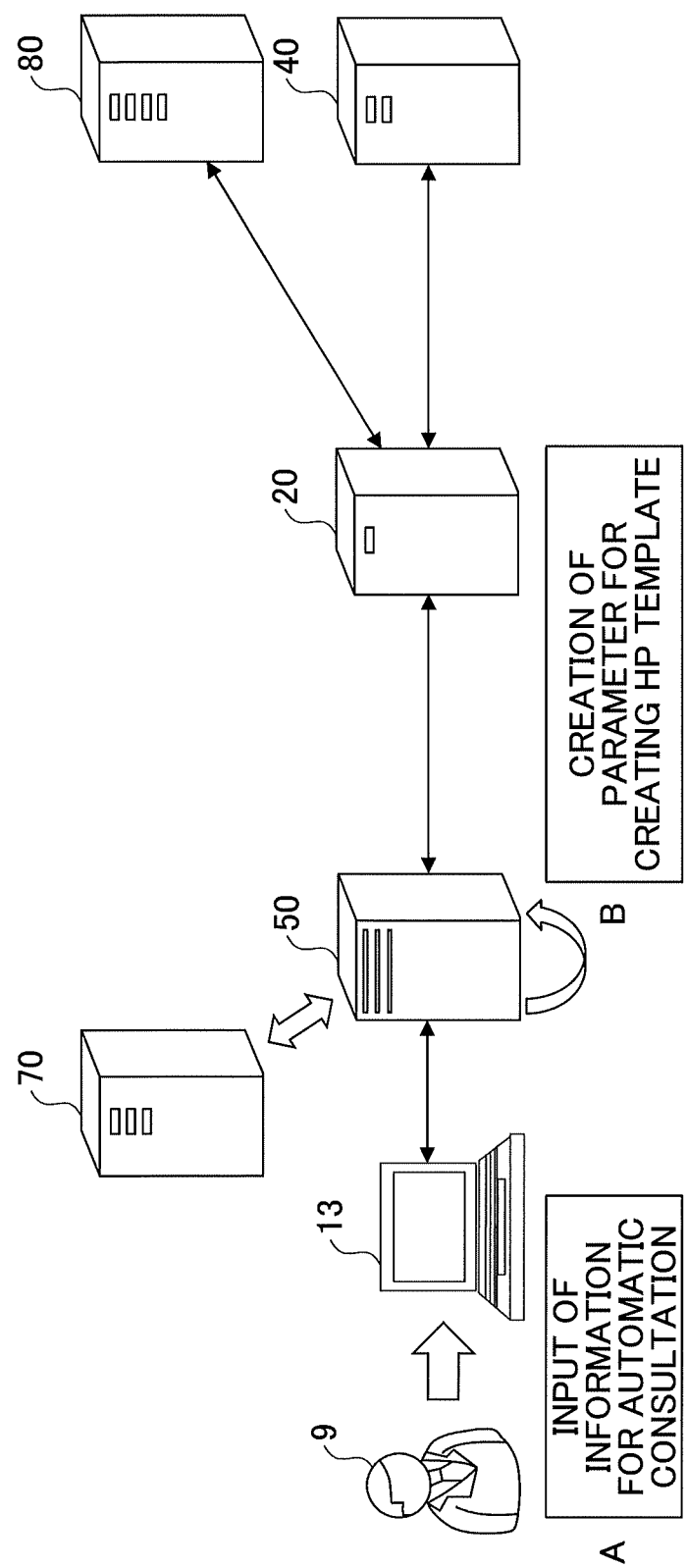

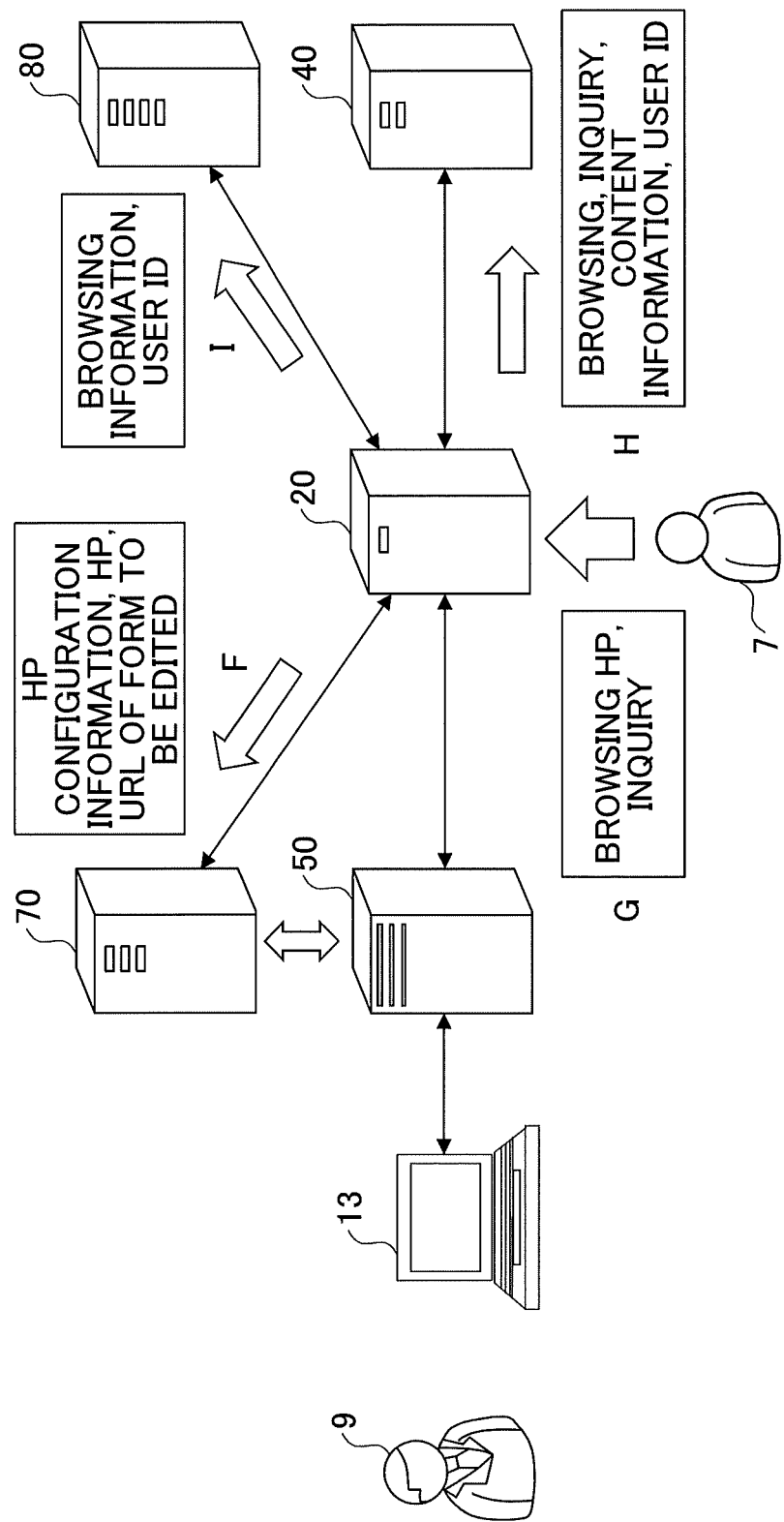

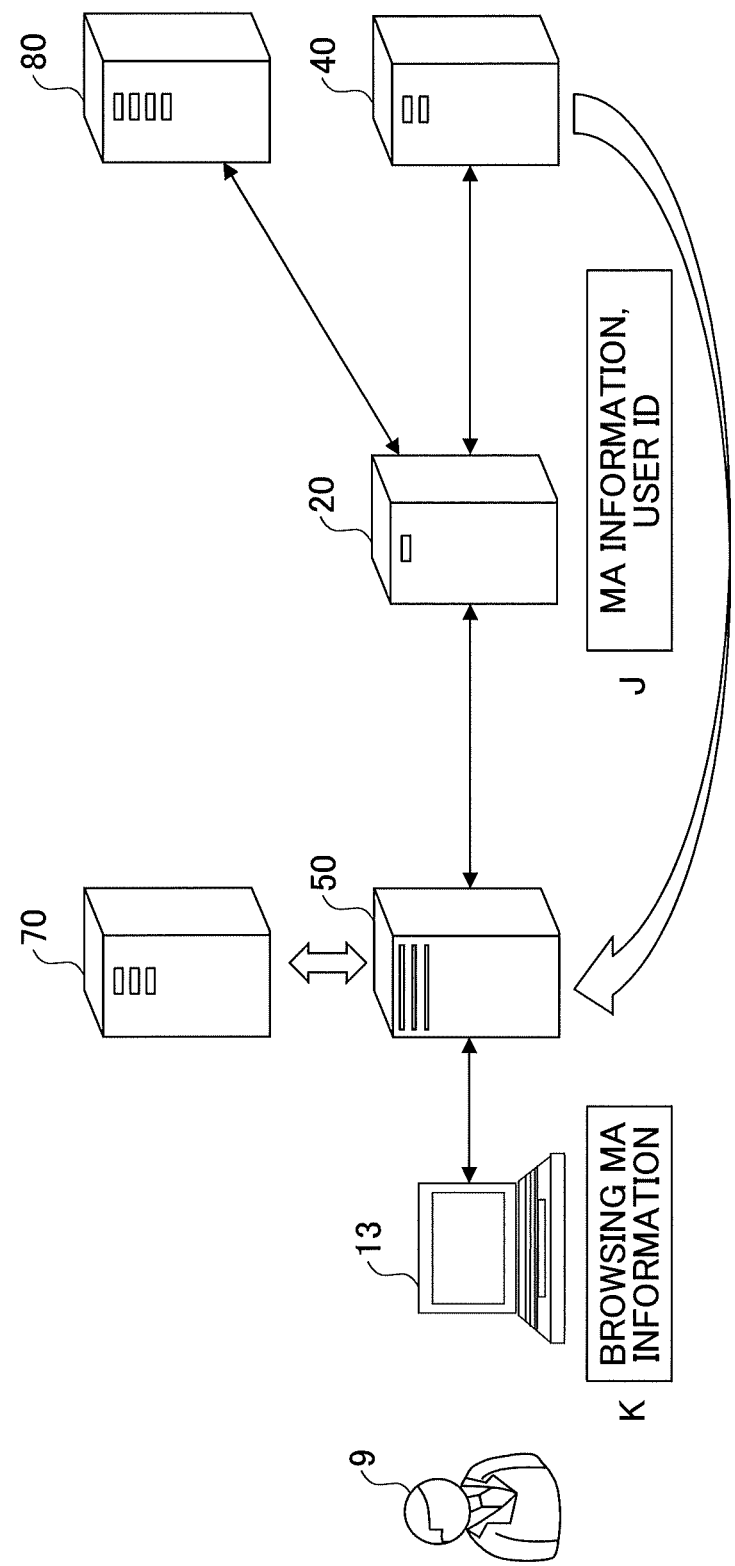

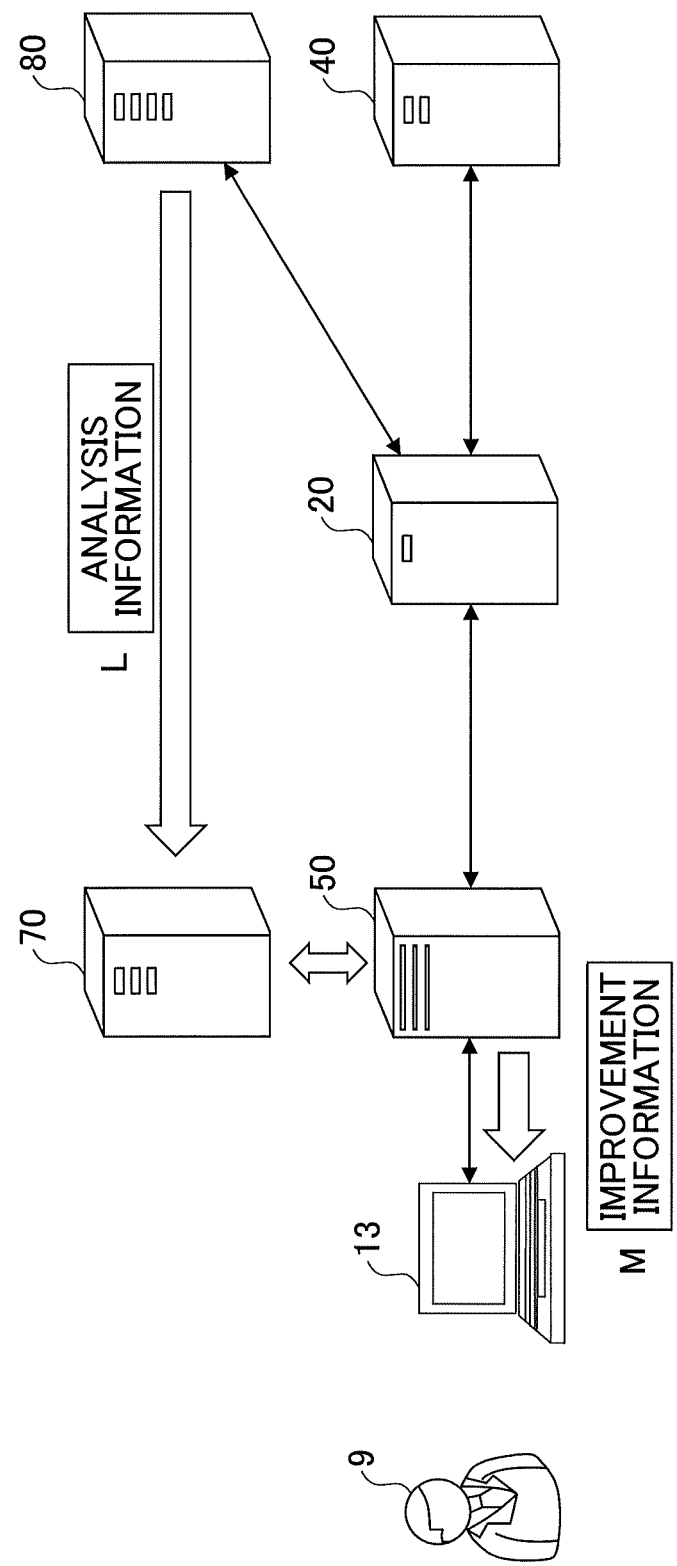

PROPOSAL OF CONTENTS

BUSINESS TYPE SELECTION

STEP 1

401

MANUFACTURING BUSINESS

▽ PLEASE CLICK BUSINESS TYPE SIMILAR TO THAT OF YOUR COMPANY.

● BUSINESS TYPE 1  ○ BUSINESS TYPE 2  ○ BUSINESS TYPE 3
○ BUSINESS TYPE 4  ○ BUSINESS TYPE 5  ○ BUSINESS TYPE 6

(b)

SELECTION OF WEB SITE TYPE

STEP 2

411

PLEASE SELECT WEB SITE TYPE.

● CORPORATE SITE
○ DEPARTMENT SITE
○ COMMODITY/SERVICE DEDICATED SITE (MICRO SITE)
○ BLOG/INFORMATION SITE

|  | BUSINESS TYPE 1 | BUSINESS TYPE 2 |
|---|---|---|
| INTRODUCTION EXAMPLE | 200 | 50 |
| TECHNICAL INTRODUCTION | 100 | 200 |
| TRADE RECORD | 50 | 100 |
| DEVELOPMENT UNTOLD STORY | 20 | 20 |

(b)

|  | CORPORATE SITE | DEPARTMENT SITE | MICRO SITE | BLOG/ INFORMATION SITE |
|---|---|---|---|---|
| INTRODUCTION EXAMPLE | 50 | 40 | 100 | 50 |
| TECHNICAL INTRODUCTION | 40 | 100 | 80 | 40 |
| TRADE RECORD | 100 | 20 | 10 | 20 |
| DEVELOPMENT UNTOLD STORY | 20 | 50 | 50 | 100 |

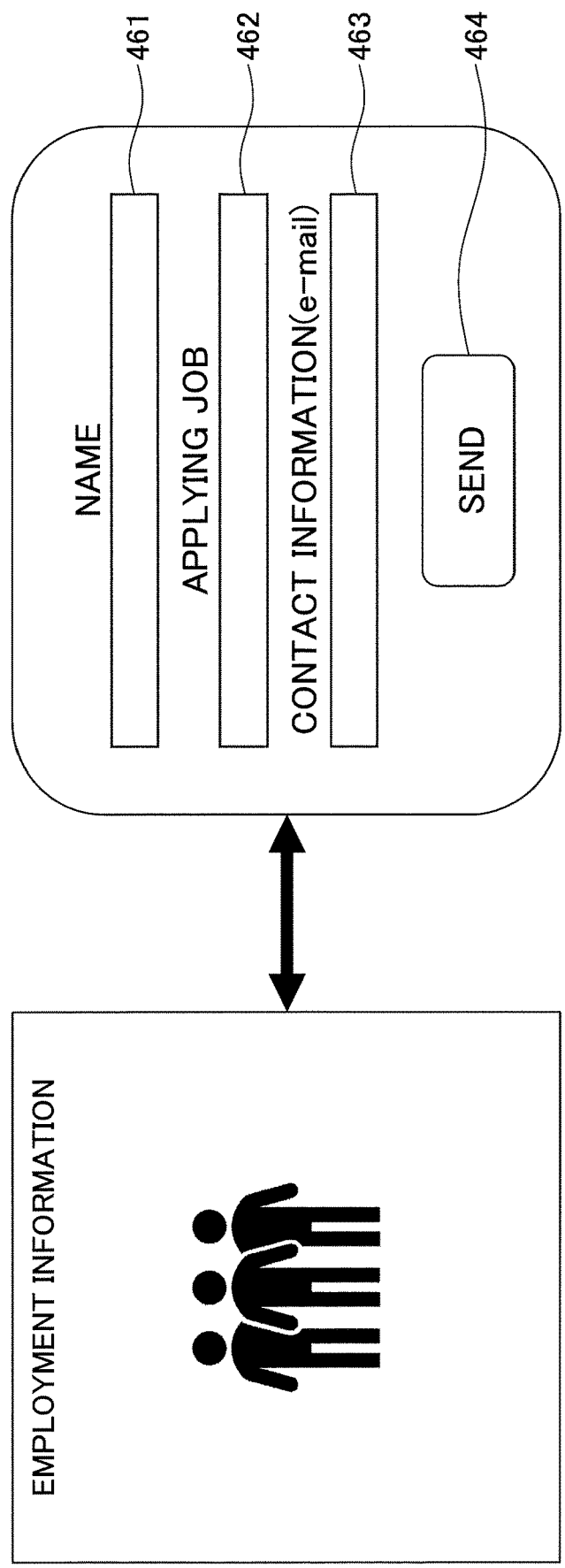

FIG.16A

```
INQUIRY FORM
<form id="form1" action="/example.com/hoge" method="post">    ———— DESCRIPTION 1
  <div>
    <label for="name">NAME:</label> <input type="text" id="name"  ⎫
name="user_name">                                                  ⎬ DESCRIPTION 2
  </div>                                                           ⎭
  <div>
    <label for="company">COMPANY NAME:</label> <input type="text" id="company"  ⎫ DESCRIPTION 3
name="user_company">                                                              ⎭
  </div>
  <div>
    <label for="mail">CONTACT INFORMATION(e-mail):</label> <input type="email" id="mail"  ⎫ DESCRIPTION 4
name="user_mail">                                                                          ⎭
  </div>
  <div>
    <label for="msg">INQUIRY CONTENT:</label> <textarea id="msg"  ⎫ DESCRIPTION 5
name="user_message"></textarea>                                    ⎭
  </div>
  <input type="submit" value="SEND">  ———— DESCRIPTION 6
  </div>
</form>
```

FIG.16B

```
<input type="hidden" name="Email" value="suzuki@sample.co.jp,
yamada@sample.co.jp">                                           } DESCRIPTION 7
<input type="hidden" name="MAURL" value="url=Masysystem.com/aaa,
userID="companyA">                                              } DESCRIPTION 8
```

FIG.18

```
<div id="masystem_container">
    <script id = XXX  src="//XXXXXXXX.js"></script>
</div>
```

FIG.19A

```
<script>
(function(m,src){w['TrackingObject']=r;
m="companyA,12345678";                    ⎫
src="https://example.com/hoge"})          ⎬ DESCRIPTION 11
(window,document,'script','https://masystem.com/mts.js','mt'); ⎯ DESCRIPTION 12
mt('send','pageview'); ⎯ DESCRIPTION 13
</script>
```

FIG.19B

```
<script>
(function(m,src){w['TrackingObject']=r;
m="companyA,87654321";                    ⎫
src="https://example.com/hoge"})          ⎬ DESCRIPTION 11
(window,document,'script','https://ga_analytics.com/ga.js','ga'); ⎯ DESCRIPTION 12
ga('send','pageview'); ⎯ DESCRIPTION 13
</script>
```

FIG.20A

```
[
  "uri":"https://example.com/hoge",
  "date":"2018-06-12",
  "pv":"3235"
]
```

INFORMATION OF THE PV NUMBER OF A CERTAIN PAGE FOR A DAY

FIG.20B

```
[
  "domain":"example.com",
  "term":"2018-01-01—2018-06-30",
  "pv":"423514",
  "contact":"3453",
  "cv":"242"
]
```

PV, INQUIRY NUMBER, AND CV NUMBER OF ENTIRE HP FOR A HALF YEAR

INFORMATION PROCESSING SYSTEM, INFORMATION PROCESSING METHOD, PROGRAM, AND INFORMATION PROCESSING APPARATUS

CROSS-REFERENCE TO RELATED APPLICATIONS

This application is based on and claims priority to Japanese Patent Application No. 2019-036789, filed on Feb. 28, 2019, the entire contents of which are incorporated herein by reference.

BACKGROUND OF THE INVENTION

Field of the Invention

The present invention relates to an information processing system, an information processing method, a program, and an information processing apparatus.

Description of the Related Art

Marketing has used mass media, such as television, radio, magazine, and train advertising, to attract customers. In recent years, digital marketing using digital channels has been used. Digital marketing refers to the use of all digital channels, such as websites, e-mails, SNS, smartphone apps, and IoT (Internet of Things), to implement appropriate promotional measures, and to visualize and market customer data.

In general consumer digital marketing (B to C), measures are taken to impress the commodity and encourage consumers to purchase the product quickly. However, in corporate digital marketing (B to B), lead generation is important. Lead generation refers to marketing activities to acquire a potential customer. For example, it uses digital channels such as websites to conduct marketing activities that increase the number of inquiries. A typical example is the process of creating a company's website and obtaining customer information from the website. In B to B, sales activities are also initiated after lead nurturing to identify and approach a potential customer. A typical example of lead nurturing is the practice of sending direct mail.

Various tools are provided to support digital marketing, and users are implementing marketing measures using a CMS (Content Management System) tools to support lead generation and MA (Marketing Automation) tools to support lead nurturing. An example of a CMS tool is a tool that supports the creation of a home page, and an example of a MA tool is a tool that analyzes an access to a home page. There is also an analysis tool that analyzes an access to what issue exists to improve a CVR (Conversion Rate) from the website.

In connection with such a technique, a technique is known in which a person in charge automatically creates a home page by entering the necessary information into a template (see, for example, Patent Document 1). In addition, a technique for sending a direct mail is known (see, for example, Patent Document 2). In addition, a technique of obtaining customer information by setting up an inquiry form on a website is known (see, for example, Patent Document 3).

PATENT DOCUMENTS

[Patent Document 1] Japanese Unexamined Patent Publication No. 2012-039471
[Patent Document 2] Japanese Unexamined Patent Publication No. 2007-102364
[Patent Document 3] Japanese Unexamined Patent Publication No. 2017-122959

Conventionally, however, even if the analysis tool analyzes the problems of the home page and presents the analysis result to the user, the user needs to consider how to specifically improve the home page and perform predetermined tasks on the home page to improve the home page. However, it is not easy for users who are not always familiar with the creation of websites to do this.

In view of the above described problems, the present invention is intended to provide an information processing system that can effectively propose information for improving the website.

SUMMARY OF THE INVENTION

An information processing system includes at least one information processing apparatus that communicate with a first service for supporting to create a home page and a second service for creating an analysis result by analyzing information related to browsing of the home page via a network, a home page information reception unit that receives home page configuration information concerning a configuration of the home page from the first service, an analysis result reception unit that receives an analysis result from the second service, an improvement information creation unit that creates improvement information for improving the home page based on the home page configuration information and the analysis result, and a communication unit that sends the improvement information created by the improvement information creation unit to a user terminal operated by a user. BRIEF DESCRIPTION OF THE

DRAWINGS

FIG. 1 schematically illustrates an example of an object in a digital marketing using various tools.

FIG. 2 schematically illustrates an example of an outline of an information processing system.

FIGS. 3A to 3C schematically illustrate an example of a configuration example of the information processing system and processing in time series.

FIGS. 4A and 4B schematically illustrate an example of a configuration example of the information processing system and processing in time series.

FIG. 10 illustrates an example of a wizard screen provided by the consulting unit of the support server for entering the target of what kind of measures the user wishes to take in digital marketing.

FIG. 11 illustrates an example of a parameter conversion DB.

FIGS. 15A and 15B illustrate examples of different types of inquiry form.

FIGS. 16A and 16B illustrate examples of embedding a send destination mail address and MA identification information for the HP template.

FIG. 18 illustrates an example of a form code.

FIGS. 19A and 19B illustrate an example of a MA tag and an analysis service tag described in a scripting language.

FIGS. 20A and 20B illustrate an example of browsing information sent when the MA tag is executed.

DESCRIPTION OF THE EMBODIMENTS

Hereinafter, as an example of an embodiment of the present invention, and an information processing system and an information processing method performed by the information processing system will be described.

BACKGROUND OF THE EMBODIMENTS FOR THE USE OF THE TOOLS

Figure 1:
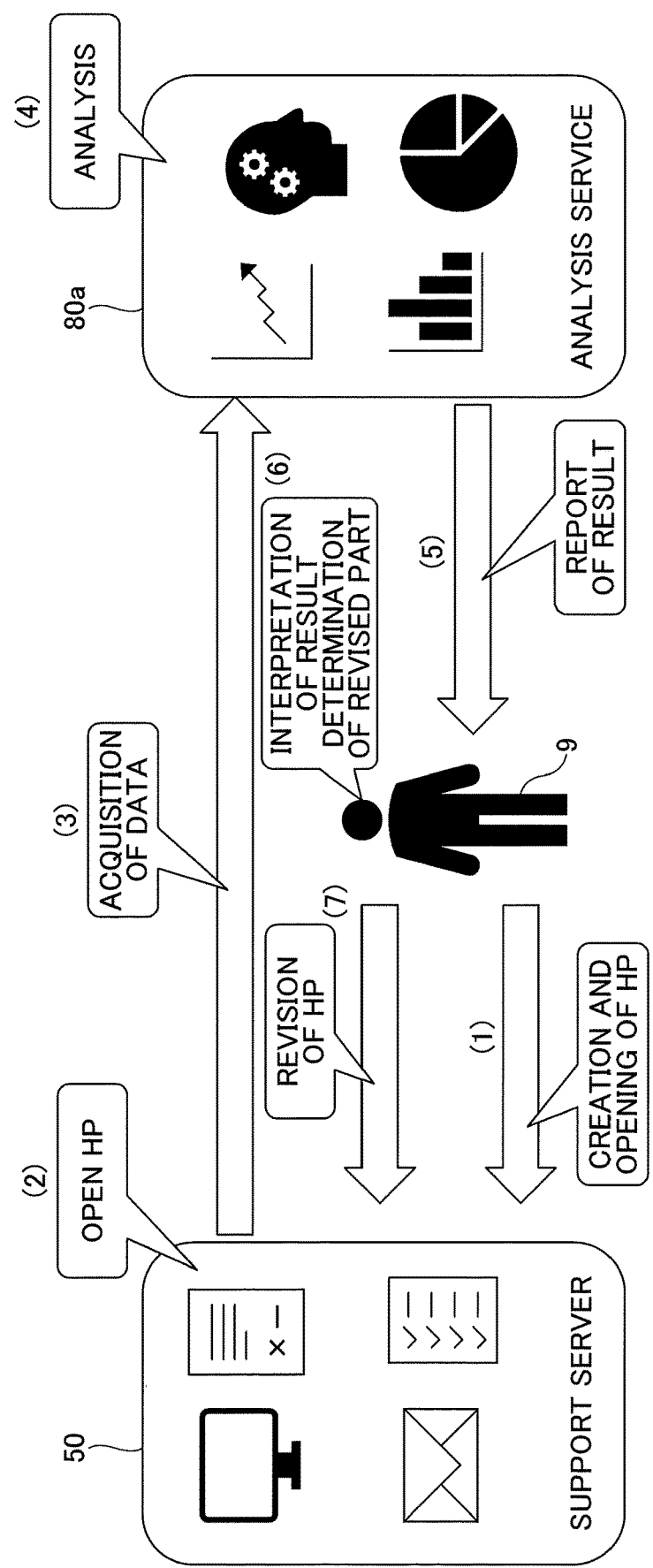
Figure 3B:
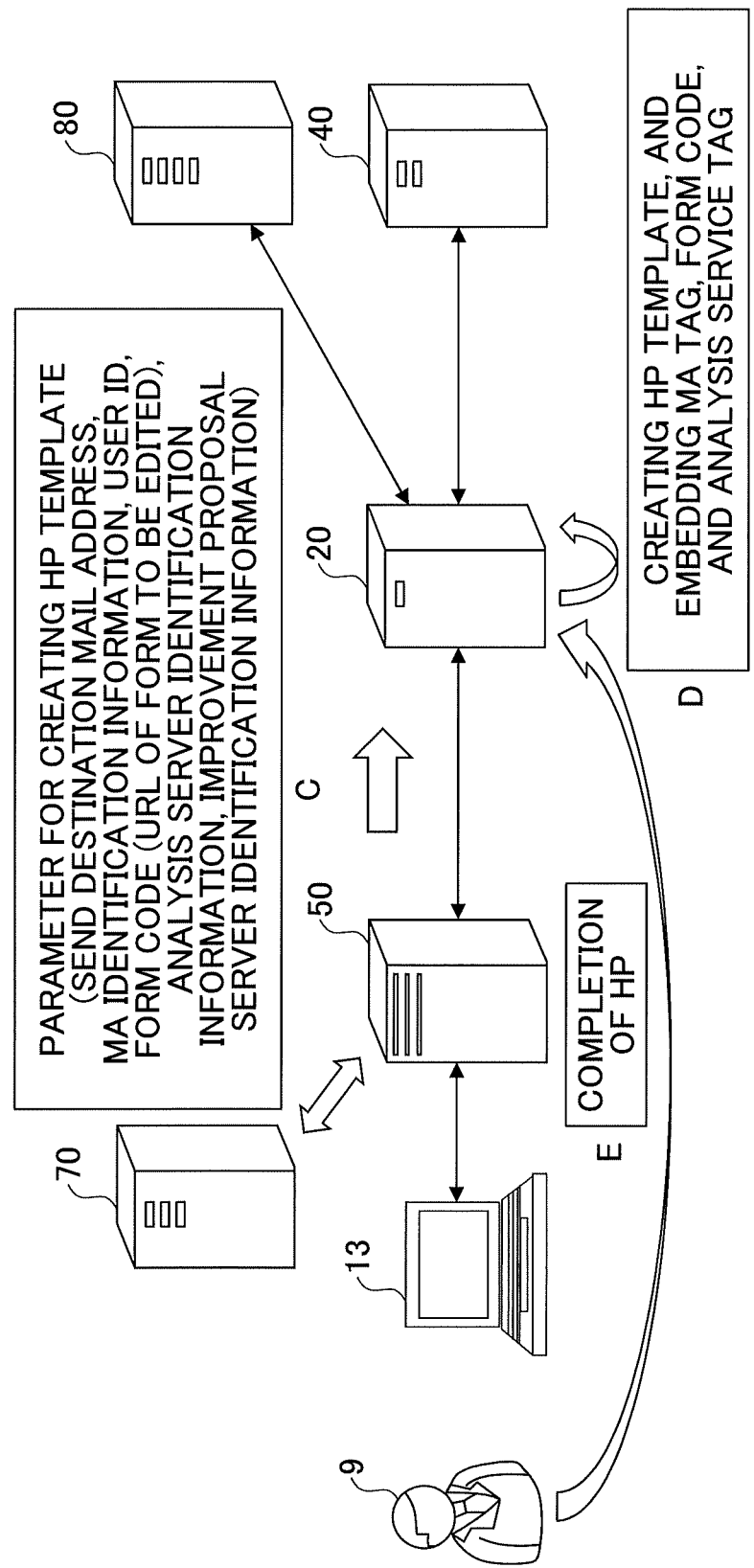

First, the above subject will be further described with reference to FIG. 1. FIG. 1 is an example of a schematic illustration of the subject in conventional digital marketing using various tools.

(1) The user creates a home page using a CMS tool and requests the support server 50 to open the information.

(2) The support server 50 makes a home page open to an HP open server.

(3) When the customer visits and views the home page, the HP open server sends browsing information to the analysis service 80a.

(4) The analysis service 80a analyzes the browsing information and analyzes, for example, a subject of the home page for increasing the number of visits and the CVR (Conversion Rate).

(5) analysis result can be obtained when the user appropriately accesses the analysis service 80a.

(6) The user interprets an analysis result and decides how to improve the home page.

(7) The user improves the home page.

However, because an analysis result of the analysis service is obtained by a mechanical analysis using software, there are many numerical values, and the expressions and terms that are easy for users to understand are not necessarily used. Therefore, users who have difficulty in deciding how to improve the home page are not few.

SUMMARY OF THE PRESENT EMBODIMENT

FIG. 2 is an example of a diagram illustrating an outline of an information processing system 100 according to the exemplary embodiment. In the present embodiment, the information processing system 100 includes an improvement proposal server 70. The improvement proposal server 70 may be an additional function of the support server 50 and is separate from the support server 50 in FIG. 2. However, the improvement proposal server 70 is a service provided in association with the support server 50.

The service provided by the CMS tool is referred to as the CMS service (one example of the first service), the server providing the CMS tool is referred to as the CMS server 20, the service provided by the MA tool is referred to as the MA service (one example of the third service), and the server providing the MA tool is referred to as the MA server 40. The service provided by the analysis tool is called the analysis service (one example of the second service), and the server that provides the analysis tool is called the analysis server 80. The user 9 is the user of the information processing system 100 and is the user of the support server 50 and the improvement proposal server 70. It is also indirectly a user of the CMS server 20, the MA server 40, and the analysis server 80.

First, (1) to (3) may be the same as those in FIG. 2.

(4) The CMS server 20 sends the HP configuration information (the home page configuration information) of the home page disclosed by the user to the improvement proposal server 70. The MA server 40 sends the browsing information to the improvement proposal server 70. The analysis server 80 also analyzes the browsing information and sends the analysis result of how to improve the home page in order to increase the number of visits and the CVR to the improvement proposal server 70.

(5) The improvement proposal server 70 generates the improvement information having the analysis result corresponding to the specific correction point of the home page.

(6) The improvement proposal server 70 sends the improvement information to the support server 50.

(6') The improvement information may be sent to the support server 50 when the user requests the support server 50 for the improvement information.

(7) The support server 50 presents the improvement information to the user.

(8) The user can improve the home page based on specific improvements made to the home page.

As described above, because the improvement proposal server 70 generates the improvement information from the analysis result, the information processing system 100 according to the present embodiment can improve the home page effective for lead generation even to a user who is not necessarily familiar with the digital marketing technology.

Terminology

Lead generation means the actualization of potential customers. For example, lead generation is an activity to acquire potential customers. It is targeted to acquire personal information about an individual or company that are interested in the own company's product or service, rather than an unspecified number of potential customers. In a broad sense, the activity that does not use the home page (or a website) are also included. In this embodiment, however, an activity that mainly uses the home page is mainly used.

Lead-narrowing refers to personalizing customers who are actualized. For example, this refers to activities to train and educate potential customers to become contract or order recipients. For example, it refers to activities that connect potential customers collected through lead generation with e-mail magazines, etc., and lead to actual sales opportunities and business negotiations, etc.

A home page is a screen presented by the World Wide Web (WWW) system used on the Internet. All pages on which the terminal device can display may be included, as well as the pages on which it will first display. Also referred to as a Web site or a Web page, and also referred to in this embodiment as not strictly distinguishable.

The browsing information is the information extracted from the behavior of the browsing person (e.g. number of browsing, staying period of time, whether withdrawal is done, agreement of contract). This includes information that is processed secondarily.

Summary of Overall Operation

A summary of the information processing system 100 will be described with reference to FIGS. 3A to 4B. FIGS. 3A to 4B are examples of a configuration example of the information processing system 100 and an example of a diagram explaining processing in a time-series manner. As illustrated, the information processing system 100 includes a user terminal 13, a support server 50, a CMS server 20, a MA server 40, an improvement proposal server 70, and an analysis server 80. Because the user 9 can utilize a CMS tool provided by the CMS server 20, a MA tool provided by the MA server 40, and an analysis tool provided by the analysis server 80, each via the support server 50, the support server 50 provides the user 9 with a one-stop service, that is, the CMS server 20, the MA server 40, and the analysis server 80. Further, although the improvement proposal server 70 is substantially integral with the support server 50, the user 9 can be used separately through the support server 50.

FIGS. 3(a) to 3(c) and FIG. 4(a) and FIG. 4(b) describe a procedure in which the user 9 accesses the support server 50 by the user terminal 13 to associate the CMS server 20 and the MA server 40, and a procedure for creating the improvement information of the home page based on the analysis result provided by the analysis server 80.

A. The user 9 enters the purpose of what measures to take in digital marketing (hereinafter referred to as "information for automatic consultation") into the user terminal 13.

B. The support server 50 has developed knowledge in advance to convert the information for automatic consultation to content suitable for achieving the purpose of the user 9 based on the information for automatic consultation, and creates a parameter for creating an HP template from the information for automatic consultation. The parameter used for creating the HP template contains the content that is included by the HP and effective for achieving the goal.

C. The support server 50 sends the parameter for creating the HP template to the CMS server 20. When the support server 50 sends the parameter for creating the HP template to the CMS server 20, the support server 50 sends the send destination mail address (the destination to which inquiry content or the like is sent), the MA identification information (the information to identify the MA server 40 associating with the CMS server 20), the user ID (to identify the MA information of the user 9), the form code (the URL in which the form is edited), the analysis server identification information, and the improvement proposal server identification information.

D. The CMS server 20 creates the HP template based on the parameter for creating the HP template. Because the parameter for creating the HP template indicates the content that HP should have, the CMS server 20 creates an HP template suitable for this content. For example, if the introduction result is content, an HP template will be created to fill out a customer's photo, customer comment, and product introduced.

The CMS server 20 also embeds into the HP template a MA tag, a form code (including a send destination of input content for inquiry form), and an analysis service tag. The send destination of the MA tag, the form code, and the analysis service tag are described, for example, in an HTML tag or JavaScript ("JavaScript" is a registered trademark), allowing the browsing person to transmit the browsing information obtained from viewing the HP and the inquiry content to the MA server 40 and the analysis server 80. The CMS server 20 generates an URL for HP creation for completing the home page.

E. Because the HP template is only a template and does not contain the actual content, the user 9 completes the home page according to the HP template using the URL for creating the HP.

F. Upon completion of the home page, the CMS server 20 sends the HP configuration information to the improvement proposal server 70. The CMS server 20 also sends the URL to which the form is edited and the URL to which the home page is edited to the improvement proposal server 70. Because the analysis result of the analysis server 80 are compatible with each page of the website, forms in the page, and the like, the analysis result need to be associated with the HP configuration information in order to create the improvement information. The URL also makes it easier for users to edit their home pages and forms. The improvement proposal server 70 is identified by the improvement proposal server identification information.

G. Once the home page is complete and made open in the public, the browsing person 7 browses the home page. If the browsing person wants more detailed information, the browsing person is required to input inquiry content such as the company name, a mail address, etc. in the inquiry form. If the browsing person does not actually input the company name, etc., a domain may be identified from the IP address of the browsing person and the company name may be identified from the domain.

H. The CMS server 20 sends the browsing information and the inquiry content to the MA server 40. The MA server 40 is designated by MA identification information set in the above "C". The user ID is sent along with the browsing information and the inquiry content. This is to deliver the MA information acquired from the home page created by the user 9 to the user 9. Similarly, the MA information may be sent to the destination mail address set by "C".

I. The CMS server 20 also sends the browsing information to the analysis server 80. This is to analyze how the home page should be improved by the analysis server 80. The analysis server 80 is identified by the analysis service tag. Which analytical service tags are embedded in the home page may be identified in the analytical server identification information.

J. The support server 50 acquires the MA information associated with the user ID from the MA server 40. The acquisition method may be a PULL or PUSH method.

K. The user 9 can access the support server 50 to view the MA information. As described above, the user 9 can communicate with the support server 50 almost exclusively, and digital marketing using the CMS tool and the MA tool is possible even if the user 9 is not familiar with the IT technology.

L. The improvement proposal server 70 accesses the analysis server 80 by designating the user ID and acquires the analysis result of the home page analyzed based on the browsing information from the analysis server 80. The opportunity of transmitting the analysis result may be periodic or at the user's request. The improvement proposal server 70 combines the HP configuration information with the analysis result to generate the improvement information indicating how to improve the home page specifically. The improvement information is sent to the support server 50.

M. When the user operates the user terminal 13 to communicate with the support server 50, the user can check the improvement information and improve the home page.

Example of System Configuration

Figure 5:
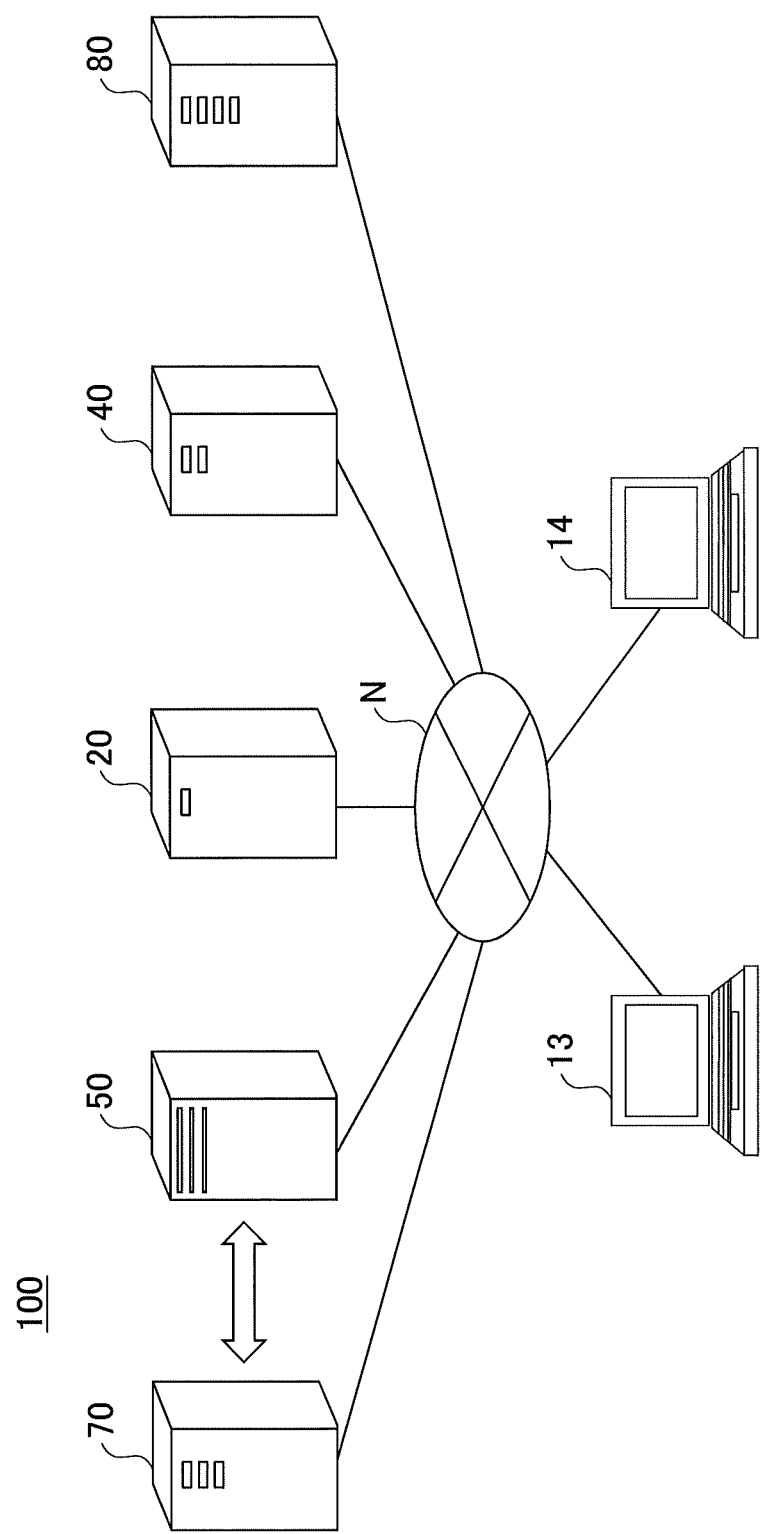
FIG. 5 illustrates an example of a system configuration of the information processing system.

FIG. 5 is an example of a system configuration diagram of an information processing system 100. The information processing system 100 includes a support server 50, a CMS server 20, a MA server 40, an improvement proposal server 70, an analysis server 80, a user terminal 13, and a browsing person terminal 14 that are capable of communicating through the network N. Communication enabled means that communication is not required at all times, and communication is possible when necessary.

Network N is assumed to be a general network such as the Internet. It may include corporate or home LANs, wide area Ethernet™ or WANs consisting of multiple LANs. The network may be partially or entirely wireless. The wireless network may include a wireless LAN, WiMAX, as well as a cellular telephone network such as 3G, 4G, and 5G.

The support server 50, the CMS server 20, the MA server 40, the improvement proposal server 70, and the analysis server 80 are so-called server apparatuses and have functions of information processing apparatus. A server is a computer that provides a file, data, etc. to another computer connected via the network. The server may be referred to as a Web server, HTTP server, WWW server, etc. However, the support server 50, the CMS server 20, the MA server 40, the improvement proposal server 70, and the analysis server 80 need not be a device exclusively used as a server and may be a general-purpose information processing device. Because operators of the support server 50 and the improvement proposal server 70 are the same or related, the support server 50 and the improvement proposal server 70 may be the same device (one information processing device, two or more information processing devices connected by a dedicated line, the same tenant in the cloud, etc.).

For example, the CMS server acquires customer information, acquires customer interest information, and creates a list of customers. Specifically, the CMS server is a server that provides a tool for creating, updating, and managing an HP (i.e., a website). The CMS server 20 includes a home page open server which will be described later.

The MA server 40 is a server that provides or supports lead nurturing that makes a conspicuous customer a potential customer. For example, e-mail delivery, print shipments, open counts, observations of other echo behaviors, echo counts, accuracy analysis, approach classification, approach judgment, confirmation, business negotiation scheduling, initial visits/re-visits, proposals, contracts, etc. A simple example provides a MA tool for analyzing access to a home page.

The CMS server 20 and the MA server 40 may not be separate servers, and one server may provide CMS and MA tools. In practice, there are many CMS servers 20 and MA servers 40, and the support servers 50 can cooperate with the respective CMS servers 20 and MA servers 40. As to which CMS server 20 or MA server 40 is to be used, there may be a method in which the support server 50 selects from the functions and costs of the CMS server 20 or MA server 40. If it is difficult or not troublesome for the user to select the CMS server 20 or the MA server 40, the method specified by the user is contemplated. The support server 50 may provide an indication (function, popularity, etc.) that the user selects the CMS server 20 or the MA server 40.

The analysis server 80 acquires browsing information about how the user browsed the home page by a notification from the CMS server 20 (a tag embedded in the home page). The analysis server 80 can perform the followings:
  Analysis of inflow keywords
  Analysis of the source site (referrer analysis)
  Analysis of incoming pages (landing page analysis)
  Analysis of the conversion pathwathe
The analysis server 80 includes, but is not limited to, Google Analytics.

The improvement proposal server 70 determines which part of the home page the analysis result indicate based on the HP configuration information and creates the improvement information about which part of which page is changed and how. Or create improvement information about which form to improve on which page. For example, create an improvement information that enhances or weakens the guidance from one page to another. Create improvement information that reduces the number of items on the form. A "page" is simply a page within the website.

The user terminal 13 is a terminal device used by the user 9 and is a general-purpose information processing device having a communication function and a display function. Examples of information processing devices that may be user terminals 13 include a wearable PC such as a PC (Personal Computer), a tablet terminal, a smartphone, a cellular phone, a watch-type, or the like. In addition, the device having functions of an information processing apparatus, such as an electronic blackboard, a video conference terminal, a digital signage terminal, or a car navigation system, may be used. One or more user terminals 13 may be used.

The browsing person terminal 14 is a terminal device used by the browsing person of the HP and is a general-purpose information processing apparatus having a communication function and a display function. An example of the browsing person terminal 14 may be the same as the user terminal 13. A plurality of browsing person terminals 14 are envisioned.

The browser software operates in the user terminal 13 and the browsing person terminal 14. The support server 50 sends the screen information to the user terminal 13. Because the CMS server 20 opens an HP by the HP open server, which will be described later, the HP open server sends the screen information of the HP to the browsing person terminal 14. In FIG. 5, the CMS server 20 and the HP open server are regarded as being integrated. Screen information is written by HTML, a scripting language (JavaScript, "JavaScript" is a registered trademark) and CSS (Cascade Style Sheet). In some cases, screen information is called a web page or a web application. A web application is software or a mechanism used on a browser that operates by coordinating a program in a scripting language (e.g., JavaScript, "JavaScript" is a registered trademark) running on browser software with a program on a Web server. The user terminal 13 and the browsing person terminal 14 may not be browser software but may operate application software having equivalent functions.

<Example of a Hardware Configuration>

Subsequently, the hardware configuration of the support server 50, the CMS server 20, the MA server 40, the analysis server 80, the improvement proposal server 70, the user terminal 13, and the browsing person terminal 14 of the information processing system 100 according to the present embodiment will be described.

<<Example of a Hardware Configuration of Support Server, CMS Server, MA Server, Analysis Server, Improvement Proposal Server, User Terminal, and Browsing Person Terminal>>

Figure 6:
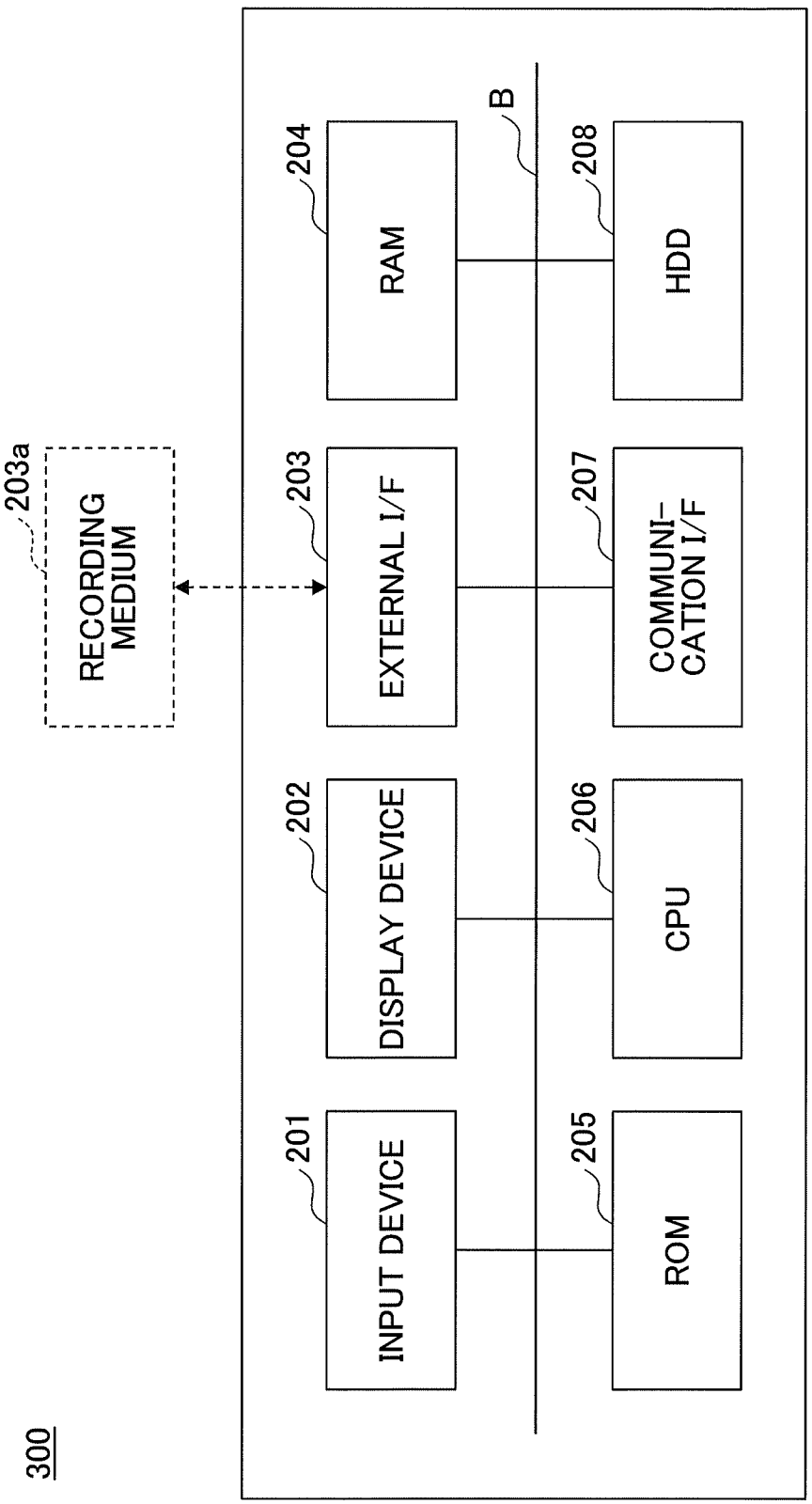
FIG. 6 illustrates an example of a hardware configuration of a computer system.

The support server 50, the CMS server 20, the MA server 40, the analysis server 80, the improvement proposal server 70, the user terminal 13, and the browsing person terminal 14 are implemented, for example, by a computer system having a hardware configuration illustrated in FIG. 6. FIG. 6 illustrates an example of a hardware configuration of a computer system 300 in accordance with the present embodiment.

The computer system 300 illustrated in FIG. 6 includes an input device 201, a display device 202, an external. I/F 203, a RAM (Random Access Memory) 204, a ROM (Read Only Memory) 205, a CPU (Central Processing Unit) 206, a communication I/F 207, and an HDD (Hard Disk Drive) 208, each of which is connected to each other by a bus B.

The input device 201 includes a keyboard, a mouse, a touch panel, or the like, and is used by user 9 to input each operation signal. A display 202 includes a display or the like to display the result of processing by the computer system 300.

The communication I/F 207 is an interface for connecting the computer system 300 to an internal network, the Internet, or the like. Accordingly, the computer system 300 can perform data communication via the communication I/F 207.

The HDD 208 is a non-volatile storage device that stores programs and data. Examples of the stored programs and data include the operating system (OS), which is the basic software for controlling the entire computer system 300, and application software that provides various functions on the OS. The HDD 208 manages the stored programs and data using a predetermined file system and/or database.

The external I/F 203 is an interface with an external device. An external device includes a recording medium 203*a* or the like. This allows the computer system 300 to read and/or write the recording medium 203*a* via the external I/F 203. The recording medium 203*a* includes a flexible disk, a CD (Compact Disk), a DVD (Digital Versatile Disk), an SD Memory Card (SD Memory Card), and a Universal Serial Bus memory (USB Memory).

The ROM 205 is a non-volatile semiconductor memory (storage device) that can hold programs and data even when the power is turned off. The ROM 205 stores programs and data such as the BIOS (Basic Input/Output System), OS settings, and network settings that are executed when the computer system 300 is started. The RAM 204 is a volatile semiconductor memory (storage device) that temporarily holds programs and data.

The CPU 206 is an arithmetic device which realizes control and functions of the entire computer system 300 by reading programs and data from the storage device such as the ROM 205 and the HDD 208 onto the RAM 204 and executing processing.

It is preferable that the support server 50, the CMS server 20, and the MA server 40 suitable for the cloud computing. Cloud computing is a form of use in which resources on a network are used without being aware of specific hardware resources.

Further, the support server 50, the CMS server 20, the MA server 40, the analysis server 80, and the input device 201 and the display device 202 of the improvement proposal server 70 may be connected to the computer system 300 as needed.

<Function>

Figure 7:
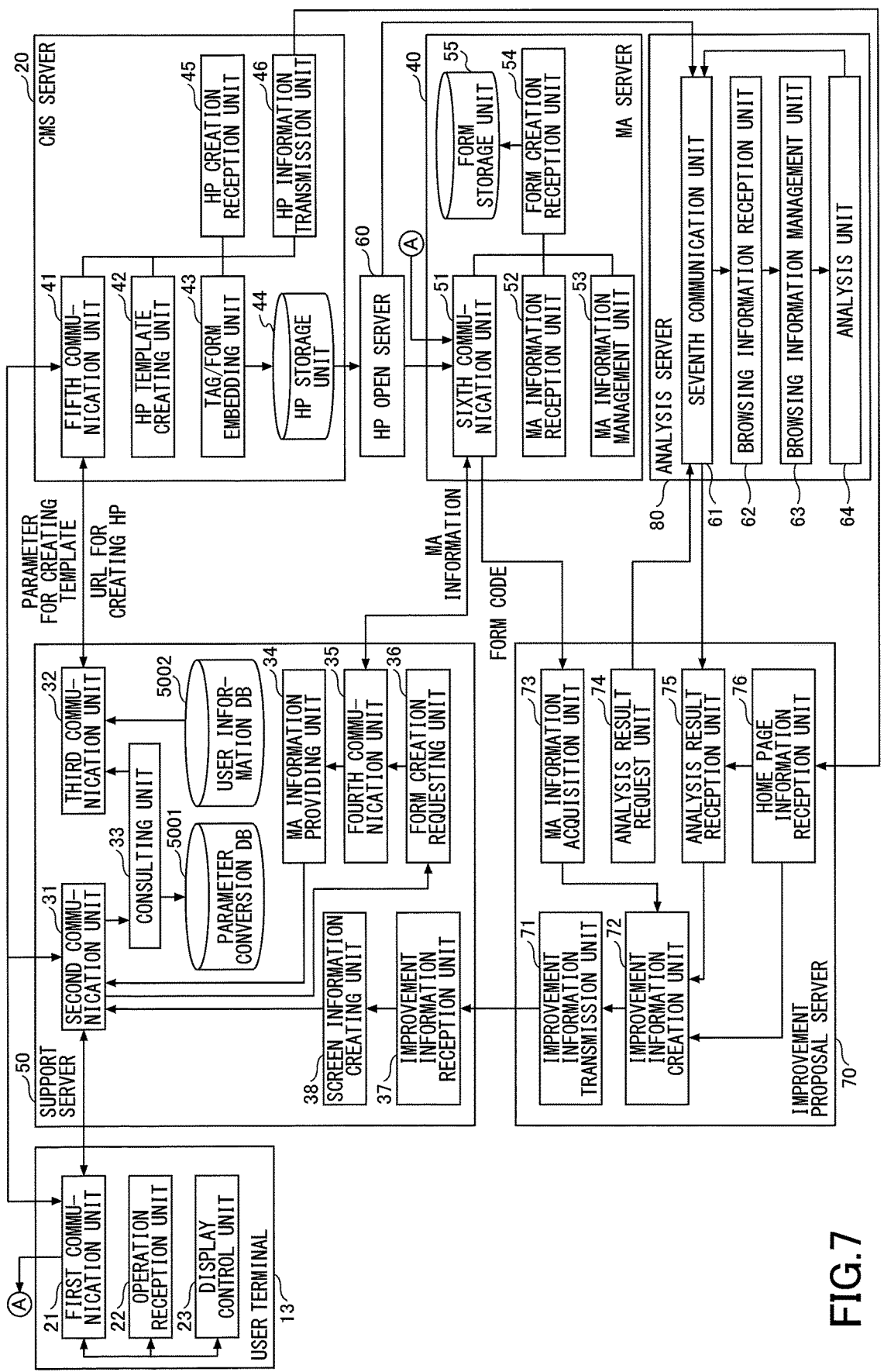
FIG. 7 is an example of a functional block diagram illustrating functions of a support server, a CMS server, a MA server, an analysis server, an improvement proposal server, and a user terminal in a block like form.

Next, the functions of the support server 50, the CMS server 20, the MA server 40, the analysis server 80, the improvement proposal server 70, and the user terminal 13 will be described using FIG. 7. FIG. 7 is an example of a functional block diagram illustrating the functions of the support server 50, the CMS server 20, the MA server 40, the analysis server 80, the improvement proposal server 70, and the user terminal 13 in a block shape. The browsing person terminal 14 has the same function as the user terminal 13.

<<User Terminal>>

The user terminal 13 includes a first communication unit 21, an operation reception unit 22, and a display control unit 23. Each of these functional units of the user terminal 13 is a function or means implemented in which one of the components illustrated in FIG. 6 is operated by instructions from the CPU 206 according to a program expanded from the HDD 208 to the RAM 204. The program may be delivered from a program delivery server or distributed as stored on a storage medium.

The first communication unit 21 sends and receives various information with the support server 50, the CMS server 20, and the MA server 40. In the present exemplary embodiment, the information for the automatic consulting is sent to the support server 50, and the MA information or the improvement information is received from the support server 50. The content of the home page are also sent to the CMS server 20 or the configuration of the home page is modified. In addition, a request for creating a form is sent to the MA server 40 or the form configuration is edited. However, this is not limited. The first communication unit 21 sends a request for acquiring screen information from the support server 50, the CMS server 20, and the MA server 40, receives screen information, and sends the information input to the screen to the support server 50 by the user 9, and sends and receives various information. Such function may be provided by the browser software.

The display control unit 23 analyzes the screen information received by the first communication unit 21 and displays the screen information on the display device 202. That is, the website (web page) is displayed. Some home pages allow users 9 to enter text data, radio buttons to select items, check boxes, and other fields displayed on a general home pages to enter information.

The operation reception unit 22 receives various operations on the user terminal 13. For example, it receives various enters to the home page, instructions for receiving information, and instructions for sending.

<<Support Server>>

The support server 50 includes a second communication unit 31, a third communication unit 32, a consulting unit 33, a MA information providing unit 34, a fourth communication unit 35, a form creation requesting unit 36, an improvement information reception unit 37, and a screen information creation unit 38. Each of these functional portions of the user terminal 13 is a function or means implemented in which one of the components illustrated in FIG. 6 is operated by instructions from the CPU 206 according to a program expanded from the HDD 208 to the RAM 204. The program may be delivered from a program delivery server or distributed as stored on a storage medium.

The support server 50 includes the parameter conversion DB 5001 and the user information DB 5002 configured on the HDD 208 illustrated in FIG. 6. First, the user information DB 5002 will be described. The parameter conversion DB 5001 and the user information DB 5002 may be provided by the support server 50 or may be present on the network N.

TABLE 1

| | |
|---|---|
| company name | sample co., ltd. |
| user ID | companyA |
| password | * * * * |
| send destination mail address of inquiry form | suzuki@sample.co.jp yamada@sample.co.jp |
| flag of opened HP | True |
| MA information latest update time and date | 2018/05/05/12:34 |
| MA identification information | https://masystem.com/aaa |
| analysis server identification information | https://ga_analytics.com/hoge |
| improvement proposal server identification information | https://improve.com/hoge |

Table 1 schematically illustrates the user information stored in the user information DB 5002. Information about the user 9 is stored in the user information DB 5002. For example, items such as company name, user ID, password, sender mail address of the inquiry form, HP published flag, latest update date and time of MA information, MA identification information, analysis server identification information, and improvement proposal server identification information are included. The company name is the name of the company that is the user 9 of the information processing system 100. The user ID is identification information for identifying or identifying the user 9. ID stands for identification and means identifier or identification information. An ID may be a name, code, character string, numeric value, or one or more of these combinations used to uniquely distinguish a particular object from multiple objects. For example, a mail address may be used as the user ID.

The send destination mail address for an inquiry form is a mail address to which the browsing person enters the inquiry content into the form embedded in the HP. Therefore, the send destination mail address of the inquiry form is also embedded in the HP, and the inquiry content that the browsing person entered on the inquiry form is sent to the form's destination e-mail address. Multiple mail addresses can be set for the send destination mail address of the inquiry form. The HP Published flag is set to whether or not the HP has been published. Because the MA information cannot be acquired unless it has been disclosed, the HP open flag is sent from the CMS server 20 to the MA server 40 when acquiring the MA information. The latest update date and time of the MA information is the date and time when the MA information was last updated. The latest update date and time is used to acquire the MA information difference.

The MA identification information corresponds to the MA server identification information and is the MA server used by this user. As indicated in Table 1, the relationship between the user and the MA server 40 may be fixed, but the support server 50 may be switched every certain period or the like. The MA identification information is embedded in the home page for transmitting the inquiry content to the MA server 40 and for transmitting the browsing information by the MA tag to the MA server 40.

The analysis server identification information corresponds to the identification information of the analysis server 80 and is the analysis server 80 used by the user. As illustrated in Table 1, the relationship between the user transmission of the HP configuration information.

Next, each function of the support server 50 will be described. The second communication unit 31 communicates with the user terminal 13 and sends and receives various information. That is, various screen information, MA information, and improvement information are sent to the user terminal 13, and information for automatic consultation is received from the user terminal 13.

The third communication unit 32 communicates with the CMS server 20 and sends and receives various information. Within this embodiment, the template creating parameter is sent to the CMS server 20. The parameters for template creation are attached with a destination mail address, MA identification information, analysis server identification information, improvement proposal server identification information, user ID, form code, page editing destination URL, and form editing destination URL. The URL for editing the page is determined by the same URL used to create the HP and the URL to edit the form is determined by the same or based on the URL in which the form was created (the URL in which the form was created is identified by the form identification information in the form code).

The support server 50 may use an API (Application Program Interface) of the CMS server 20. When the HP template is created, the third communication unit 32 receives the URL for creating the HP.

The consulting unit 33 creates parameters for creating a template referring to the parameter conversion DB 5001 based on the information for automatic consultation. The details will be described with reference to FIGS. 8 to 12.

The fourth communication unit 35 communicates with the MA server 40 and sends and receives various information. In this embodiment, the MA information and the form code are received from the MA server 40. The fourth communication unit 35 can receive the MA information through PUSH communication from the MA server 40. In this case, the MA server 40 knows the API of the support server 50 and sends the MA information to the API. The fourth communication unit 35 may perform a PULL communication in which the MA server 40 requests the MA information and receives the MA information in response to the request. In this case, the support server 50 knows the API of the MA server 40 and requests the MA information to the API. The fourth communication unit 35 designates the latest update date and time of the MA information and acquires the MA information acquired later by the MA server 40. Because the MA information is associated with the user ID in the MA server 40, the fourth communication unit 35 can acquire the MA information for each user.

The MA information providing unit 34 provides the MA information associated with the user ID to the user terminal 13 through the second communication unit 31 in response to a request from the user terminal 13.

The improvement information reception unit 37 receives the improvement information from the improvement proposal server 70. The improvement information may be sent by the improvement proposal server 70 to the support server 50 on a regular basis, or may be received by the support server 50 from the user terminal 13 and requested by the improvement information reception unit 37 to the improvement proposal server 70 as a response. The improvement proposal server 70 requests and acquires the analysis result from the analysis server 80.

The screen information creating unit 38 produces screen information of the improvement proposal screen to be described later. The screen information creation unit 38 includes the improvement information in the improvement proposal screen and embeds the edition destination URL for the user to edit the page or form in a display component such as a button.

Upon receiving a request from the user terminal 13 to create a form, the form creation requesting unit 36 requests the MA server 40 to create a form. When the MA server 40 creates the form, the form creation requesting unit 36 receives the form code through the fourth communication unit 35. The form code also contains the form identification information. The tag/form embedding unit 43 pastes the form code to the home page, allowing the browsing person to view the form.

<<CMS Server>>

The CMS server 20 includes a fifth communication unit 41, an HP template creating unit 42, a tag/form embedding unit 43, an HP creation reception unit 45, and an HP information transmission unit 46. Each of these functional units of the CMS server 20 is a function or means implemented in which one of the components illustrated in FIG. 6 is operated by a command from the CPU 206 according to a program deployed from the HDD 208 to the RAM 204. The program may be delivered from a program delivery server or distributed as stored on a storage medium.

The fifth communication unit 41 communicates with the support server 50 and sends and receives various information. In the present exemplary embodiment, the template creation parameter, the destination mail address, the MA identification information, the analysis server identification information, the user ID, the form code, the URL for editing the page, and the form editor URL are received from the support server 50. The URL for creating the HP is sent to the support server 50.

The HP template creating unit 42 creates the HP template using the parameter for creating the template. Because it is an HP template, an HP template is created in which, for example, dummy content is placed instead of actual content.

The tag/form embedding unit 43 embeds in the HP template a MA tag, an analytical service tag, an inquiry form destination mail address, MA identification information, form code, and analysis server identification information. Embedded means to describe an HTML tag or scripting language. The inquiry content are sent to at least one of the destination mail addresses and MA identification information listed in Table 1 (e.g., massystem.com/aaa). Therefore, the inquiry form embeds the destination mail address and MA identification information.

The MA tag is a tag that allows the HP open server 60 to send browsing information such as the number of browsers (PV number) generated by the browsing person viewing the HP to the MA server. The browsing information is sent to at least one MA identifier (e.g., https://masystem.com/aaa)). In this embodiment, MA identification information is included in each MA tag.

The tag/form embedding unit 43 embeds one or more user IDs in the HP template so that the user terminal 13 can display the MA information (the inquiry content and the browsing information). For example, each inquiry form and MA-tag is embedded with a user ID.

Therefore, the inquiry content is directly sent to the user by the destination mail address and further sent to the MA server. The browsing information is sent only to the MA server.

The tag/form embedding unit 43 embeds the analysis service tag and the analysis server identification information in the HP template so that the browsing information is sent to the analysis server 80. In this embodiment, the analysis service tag includes analysis server identification information.

HP templates embedded with tags and forms are stored in HP storage unit 44. The HP template is stored in a predetermined URL for each user 9. This URL is the URL for creating the HP. The user 9 acquires the HP template stored in the HP storage unit 44 from the URL for creating the HP and completes the home page. Also, get the HP template from the URL for creating the HP to improve the home page.

The completed home page is sent to the HP open server 60 and is open to the public at the HP open server 60. The CMS server 20 may publish the home page.

The HP information transmission unit 46 sends the improvement proposal server identification information to the improvement proposal server 70 as a destination. The HP configuration information can be the home page (screen information) itself or an analysis has been performed.

<<MA Server>>

The MA server 40 includes a sixth communication unit 51, a MA information reception unit 52, a MA information management unit 53, and a form creation reception unit 54. Each of these functions provided by the MA server 40 is a function or means implemented in which one of the components illustrated in FIG. 6 is operated by a command from the CPU 206 according to a program deployed from the HDD 208 to the RAM 204. The program may be delivered from a program delivery server or distributed as stored on a storage medium.

The sixth communication unit 51 communicates with the support server 50, the HP open server 60, and the user terminal 13 and sends and receives various information. First, the sixth communication unit 51 receives the MA information from the HP open server 60. In the present exemplary embodiment, the MA information is sent to the support server 50 via the support server 50 or the API of the MA server 40.

The MA information reception unit 52 accepts browse information sent by the MA tag from the HP open server 60 by viewing the home page disclosed by the HP open server 60 through the sixth communication unit 51. Similarly, for example, the inquiry content entered into the form of the home page by the browsing person are received from the HP open server 60. That is, MA information (browsing information and inquiry content) is received.

The MA information management unit 53 manages the MA information (browsing information and inquiry contents) received by the MA information reception unit 52 in association with the user ID. Therefore, the MA information for each user 9 can be sent to the support server 50 through the sixth communication unit 51.

The form creation reception unit 54 receives the form creation request from the support server 50 according to the operation of the user, creates the form of the form desired by the user, and stores the form in the form storage unit 55 corresponding to the user ID. A form code is generated and sent to the support server 50.

<<Analysis Server>>

The analysis server 80 includes a seventh communication unit 61, a browsing information reception unit 62, a browsing information management unit 63, and an analysis unit 64. Each of these functional units of the analysis server 80 is a function or means implemented in which one of the components illustrated in FIG. 6 is operated by a command from the CPU 206 according to a program deployed from the HDD 208 to the RAM 204.

The seventh communication unit 61 communicates with the improvement proposal server 70 and sends the analysis result to the improvement proposal server 70. Because the analysis server 80 does not know of the existence of the improvement proposal server 70, the analysis server 80 requests the analysis result from the improvement proposal server 70. An account of the user has been created on the analysis server 80 prior to creating the HP template. When the CMS server 20 registers information identifying the home page, such as the URL of the home page, with the analysis server 80, the analysis service tag is obtained. The analysis result request unit 74 logs in as a user's account and requests the analysis server 80 to perform an analysis result that is associated with information designating the home page.

The browsing information reception unit 62 accepts browsing information sent by the analysis service tag from the HP open server 60 by viewing the home page opened by the HP open server 60 through the seventh communication unit 61.

The browse information management unit 63 manages the browsing information received by the browse information reception unit 62 corresponding to the user ID. The analysis unit 64 analyzes browsing information associated with the user ID in response to a request or periodically generates an analysis result in which a user ID is designated from the improvement proposal server 70.

<<Improvement Proposal Server>>

The improvement proposal server 70 includes an improvement information transmission unit 71, an improvement information creation unit 72, a MA information acquisition unit 73, an analysis result request unit 74, an analysis result reception unit 75, and a home page information reception unit 76. Each of these functional portions of the improvement proposal server 70 is a function or means implemented in which one of the components illustrated in FIG. 6 is operated by a command from the CPU 206 according to a program deployed from the HDD 208 to the RAM 204.

For example, the analysis result request unit 74 designates a user ID upon a request from the user via the support server 50 or a periodical timing, and requests the analysis result of the browsing information of the home page to the analysis server 80.

The MA information acquisition unit 73 requests the MA information to the MA server designating the user ID. In addition to the analysis server 80, it is necessary to prepare the improvement information based on the browsing information and the inquiry contents. The assay result reception unit 75 receives the assay results for each user from the analysis server 80. The home page information reception unit 76 receives the HP configuration information from the CMS server 20.

The improvement information creation unit 72 creates the improvement information based on the analysis result and the HP configuration information, or the MA information and the HP configuration information. Details of the improvement information are described later.

The improvement information transmission unit 71 sends the improvement information to the support server 50 in response to a request from the user or at a timing such as a periodic time. Because the support server 50 and the improvement proposal server 70 are the same or related to the operator, the communication destinations of the support server 50 and the improvement proposal server 70 are set in advance.

<Automatic Consulting Function>

The information processing system 100 according to the present exemplary embodiment provides the support server 50 with the consulting that was conventionally performed by an experienced consultant of a consulting firm. The user 9 does not need to consult with the consultant, nor does it need to reflect the consultant's consulting results (advice) in the HP.

In this embodiment, the user 9 enters to the support server 50 an objective of what to do in digital marketing. One feature of the support server 50 is that it has an interface that accepts the enters of based on the purpose of the user 9. Hereinafter, one embodiment of the automatic consulting will be described in FIGS. 8 and 9, and another embodiment will be described in FIGS. 10 to 12.

Figure 8:
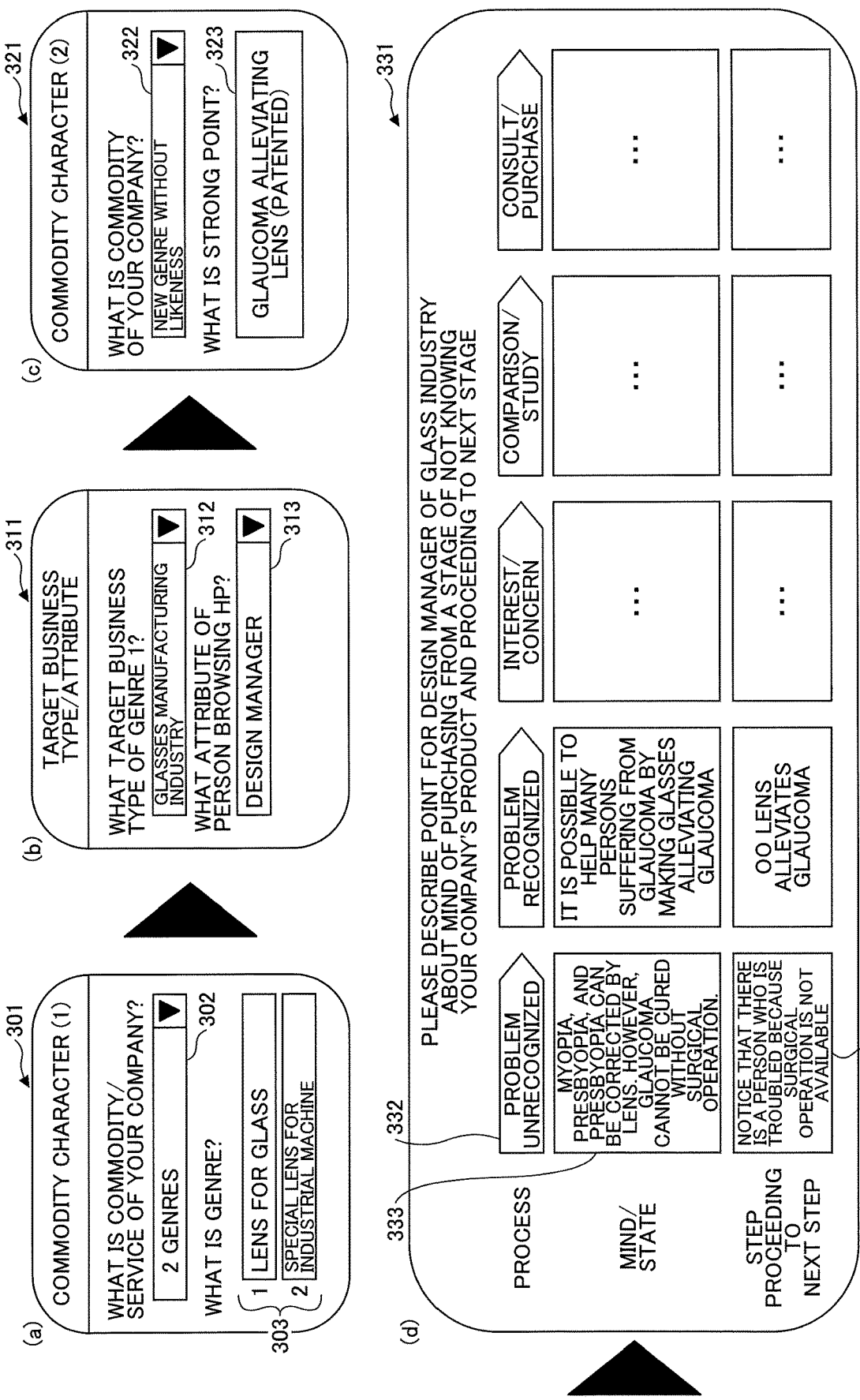
FIG. 8 illustrates an example of a screen for entering a target of what kind of digital marketing is desired by a user provided by a consulting unit of a support server.

FIG. 8 illustrates a screen example for entering the purpose of what kind of measures the user 9 wishes to take in digital marketing provided by the consulting unit 33 of the support server 50. In FIG. 8, (a) through (d) transit time-series transitions.

In FIG. 8, (a) illustrates a screen 301 for entering product characteristics on which an outline of commodities or services is entered. The commodity character entry screen 301 includes a genre number selection field 302 and a genre entry field 303. The genre number selection field 302 displays the number of genres of the commodities or services handled by the company of the user 9 in a selectable manner. A specific genre of commodities or services is entered in genre entry field 303.

In FIG. 8, (b) illustrates a target screen 311 in which the target of HP is input for each genre. The target screen 311 includes a target Business type field 312 and a target attribute field 313. In the target Business type field 312, the target Business type in which the purchase of commodities or services is expected is displayed in a selectable manner. The target attribute field 313 displays the attributes of the customers as a target, by which the purchase of commodities or services is expected.

In FIG. 8, (c) illustrates a commodity description screen 321 on which details of commodities or services are entered. The commodity description screen 321 includes a commodity character field 322 and a feature field 323. The commodity character field 322 displays the genre of commodities or services in the commodity character field 322. The feature field 323 is filled in with the features of the commodities.

In FIG. 8, (d) is a recognition process entry screen 331 for entering a process in which the commodity or the target is recognized. The recognition process entry screen 331 enters a target mind state 333 for each process 332 and a point 334 for advancing to the next step. The recognition process entry screen 331 sequentially enters the mind set from the stage when the target does not know the commodity or service of the user 9 to the time when the target purchases the product or service, and what is necessary to proceed to the next step.

In the screens of (a) to (d) in FIG. 8, the display control unit 23 sequentially transits according to the input of the user 9 by the operation reception unit 22. The information entered in FIGS. 8(*a*) to (*d*) is information for automatic consultation. When the following screen information is required, the first communication unit 21 acquires the following screen information from the support server 50. Accordingly, the user 9 can enter a vague purpose as a specific sentence or a numerical value in an interactive manner in which the user responds to the inquiry from the support server 50. This allows the user 9 to enter the purpose of what measures to take in digital marketing.

The consulting unit 33 outputs the consulting results from the information for automatic consultation. In general, a consultant obtains the consulting results from information such as automatic consultation information. The parameter conversion DB 5001 of the support server 50 is constructed with the logic generated from the knowledge obtained from the consultant. Such logic may be constructed, for example, by machine learning, or the developer may create a flow chart outputting the consulting results from information for automatic consultation.

Figure 9:
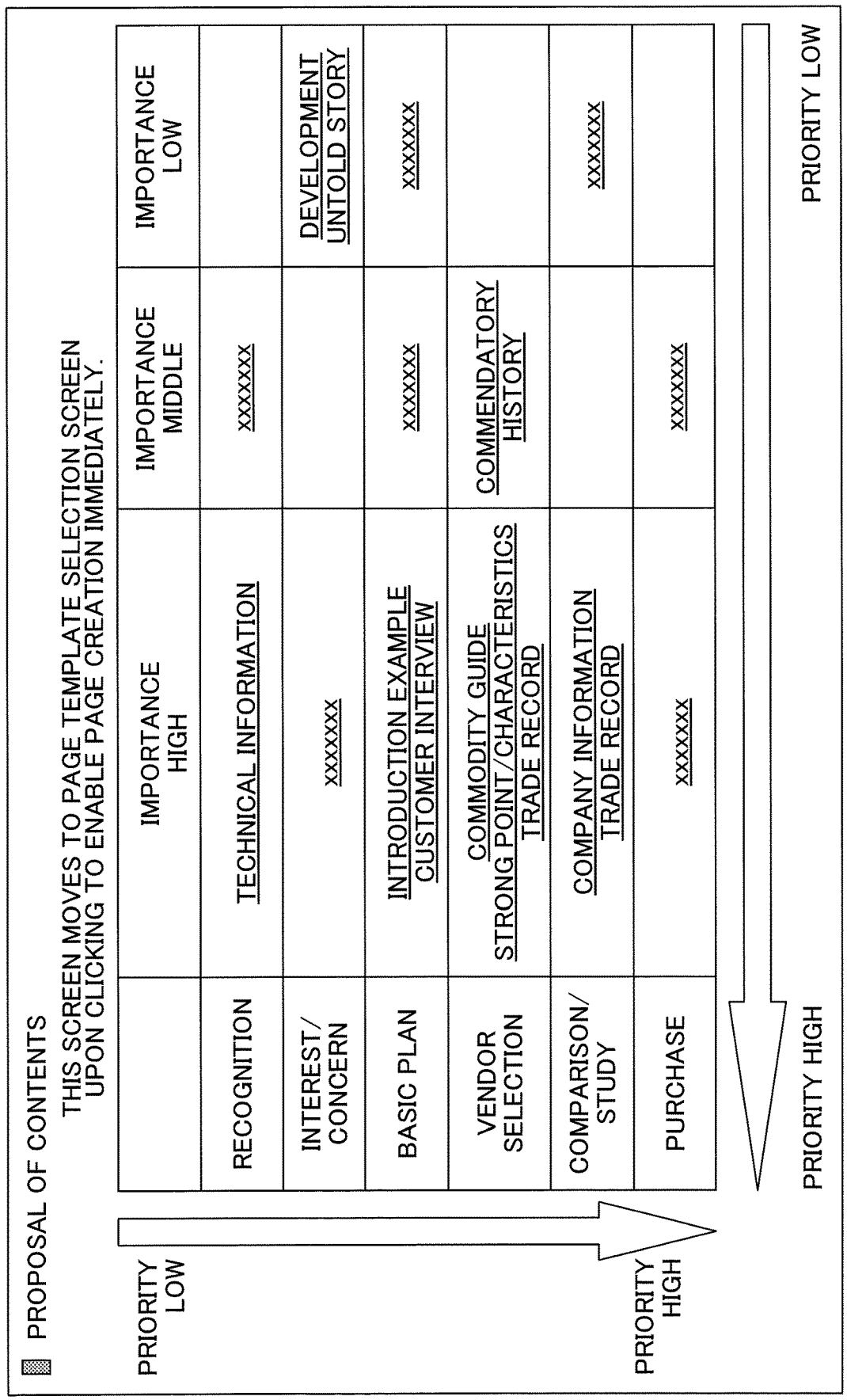
FIG. 9 illustrates an example of a consulting result output by a consulting unit.

FIG. 9 illustrates an example of a consulting result output by the consulting unit 33. The consulting results of this embodiment are parameters for creating a template for creating an HP. FIG. 9 illustrates parameters for creating a matrix-like template.

Firstly, on the vertical axis, items such as recognition, interest/concern, basic plan formulation, vendor selection, comparison/examine, and purchase are listed, and lower item has higher priority. These items and priorities are determined by the automatic consultation. On the horizontal axis, items of high importance, middle importance, and low importance are arranged from the left. Higher importance means higher priority.

The content to be included in the HP template is then indicated in association with the vertical and horizontal items. For example, the content with a high importance in the item of recognition is "technical information", while the item with a high importance in the item of comparison/examine is "company information, trade record".

The template creating parameter of FIG. 9 is sent to the CMS server 20. The support server 50 determines an HP template suitable for the content. The content and at least one HP template are previously associated.

The parameter for creating the template may also be displayed on the user terminal 13 before being sent to the CMS server 20. When the user 9 clicks the content of FIG. 9, the operation reception unit 22 receives the clicked contents, and the first communication unit 21 sends the content to the support server 50. The support server 50 relays the content to the CMS server 20, and the CMS server 20 determines at least one HP template suitable for the content and sends the at least one HP template to the support server 50. The second communication unit 31 of the support server 50 sends the HP template to the user terminal 13. This allows the user 9 to select an HP template that is suitable for the content and immediately enter the content, such as a photograph or sentence. The HP template after entering the content is sent to the CMS server 20 through the support server 50. In this case, the CMS server 20 prefers the HP template selected by the user 9 and does not create an HP template suitable for the content.

Next, another embodiment of automatic consulting will be described with reference to FIG. 10. FIG. 10 illustrates an example of a wizard screen for entering the purpose of what kind of measures the user 9 wishes to take in digital marketing provided by the consulting unit 33 of the support server 50. The wizard screen illustrated in FIG. 10 is completed by the user 9 responding to the inquiry as in FIG. 8, but the interactivity is further improved over that illustrated in FIG. 8. The wizard is a form of processing designed to allow the user 9 to operate in an interactive manner by presenting the necessary information as needed.

In FIG. 10, (a) is a business type selection screen 401. The user 9 selects the Business type of the product or service to be targeted for digital marketing. In FIG. 10 at (a), the business types 1 to 6 are illustrated. The specific business type can be confirmed if the user 9 understands what the business type specifically is or by displaying a help screen. There are not only six business types.

In FIG. 10, (b) is a web site type selection screen 411. The user 9 selects what type of web site is used to provide the products or services that are the subject of digital marketing. For example, (b) lists "corporate site", "department site", "micro site", and "blog/Information site", but the web site is not limited to them.

The content that can be easily appealed to readers will differ according to the type of Business type and website. Accordingly, the consulting unit 33 converts the response of the user 9 to a score of the importance bar of each content using the parameter conversion DB 5001 illustrated in FIG. 11.

FIG. 11 illustrates an example of a parameter conversion DB 5001. In FIG. 11, (a) illustrates the number of points matched between each Business type and each content. In FIG. 11, (b) illustrates the number of scores matched between the web site type and each content importance bar. In the business type selection screen 401 of FIG. 10(*a*), if the user 9 selects "business type 1", the scores for the content categories areas follows. 100 for "introduction example"; 100 for "technology introduction"; 50 for "trade record", and 20 "development untold story".

In the web site type selection screen 411 illustrated in FIG. 10B, when the user 9 selects the "corporate site", the score for each content category is 50 for "Introduction example;"; 40 for "technical introduction"; 100 for "trade record"; and 20 for "development untold story".

Therefore, when the user 9 selects "business type 1" on the business type selection screen 401 and "corporate site" on the type selection screen 411 of the web site, the scores of the content category are respectively as follows: "Introduction example": 250 "technical introduction": 140 "trade record": 150 "development untold story": 40

As described above, the consulting unit 33 repeats the process of converting the inputted object to a point number based on the parameter conversion DB 5001 every time the user 9 makes a selection on the wizard screen. This allows the score of each content to be determined according to each selection. The relationship between the score and the business type registered in the parameter conversion DB 5001 or the website type may be determined based on the consultant's knowledge or by machine learning.

Figure 12:
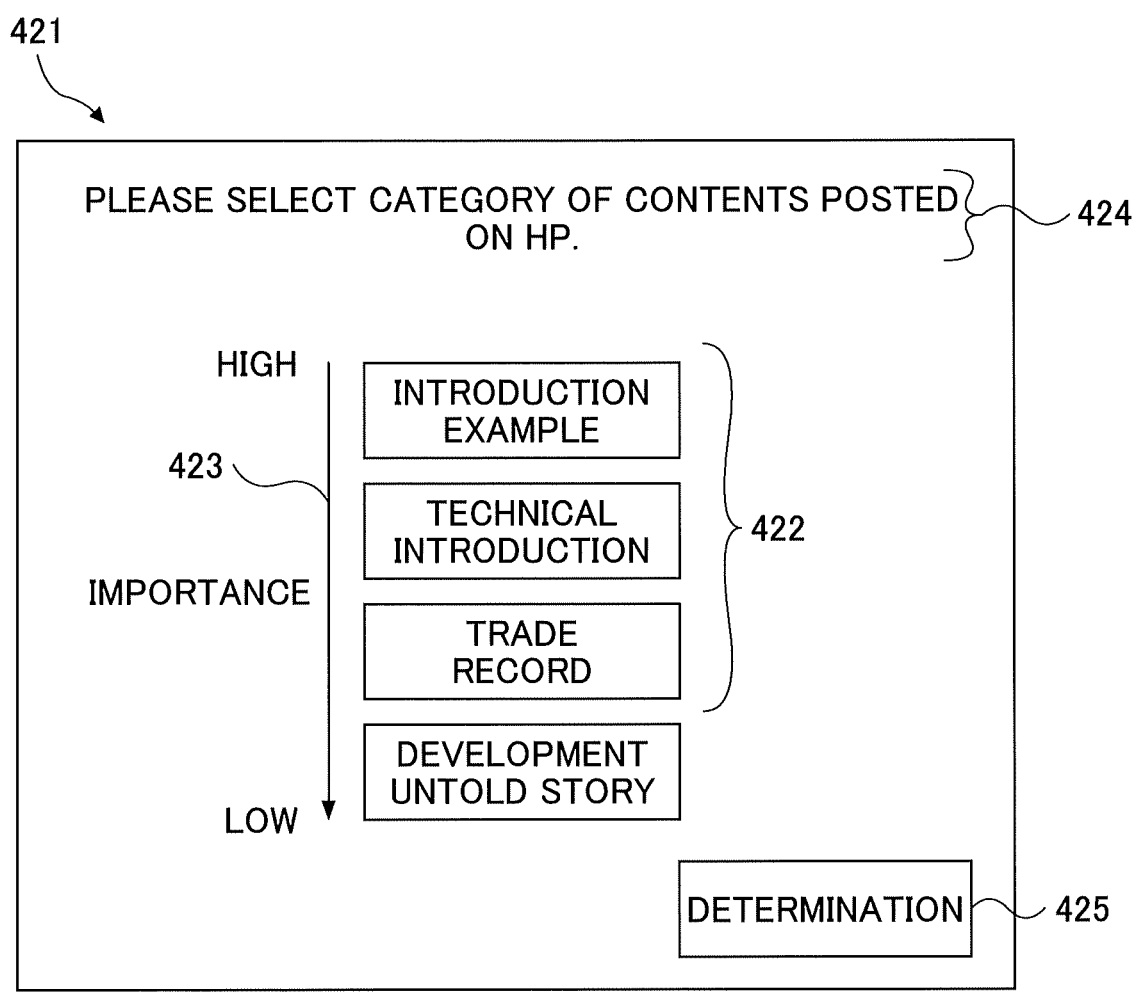
FIG. 12 illustrates an example of a content determination screen of content displayed on a display device of a user terminal by the consulting unit when a wizard screen ends.

FIG. 12 illustrates an example of the content determination screen 421 displayed on the display device 202 of the user terminal 13 by the consulting unit 33 upon completion of the wizard screen. The content determination screen 421 displays a message 424 of "Select the content category to be posted on the HP", the content category 422, the importance bar 423 of each the content category, and the determination button 425. The content category 422 is displayed above the importance bar 423 because it is judged to have higher importance as the score is higher.

The user 9 can select at least one content category to be used for HP. For example, clicking with a mouse or tapping a touch panel is used to select. The content category 422 of the selected content is highlighted, such as in a high brightness display or an inverted display. When the user 9 clicks a determination button 425 in this state, the content category 422 of the selected content is sent to the support server 50 as a parameter for template creation.

<HP Template Created by CMS Server>

Figure 13:
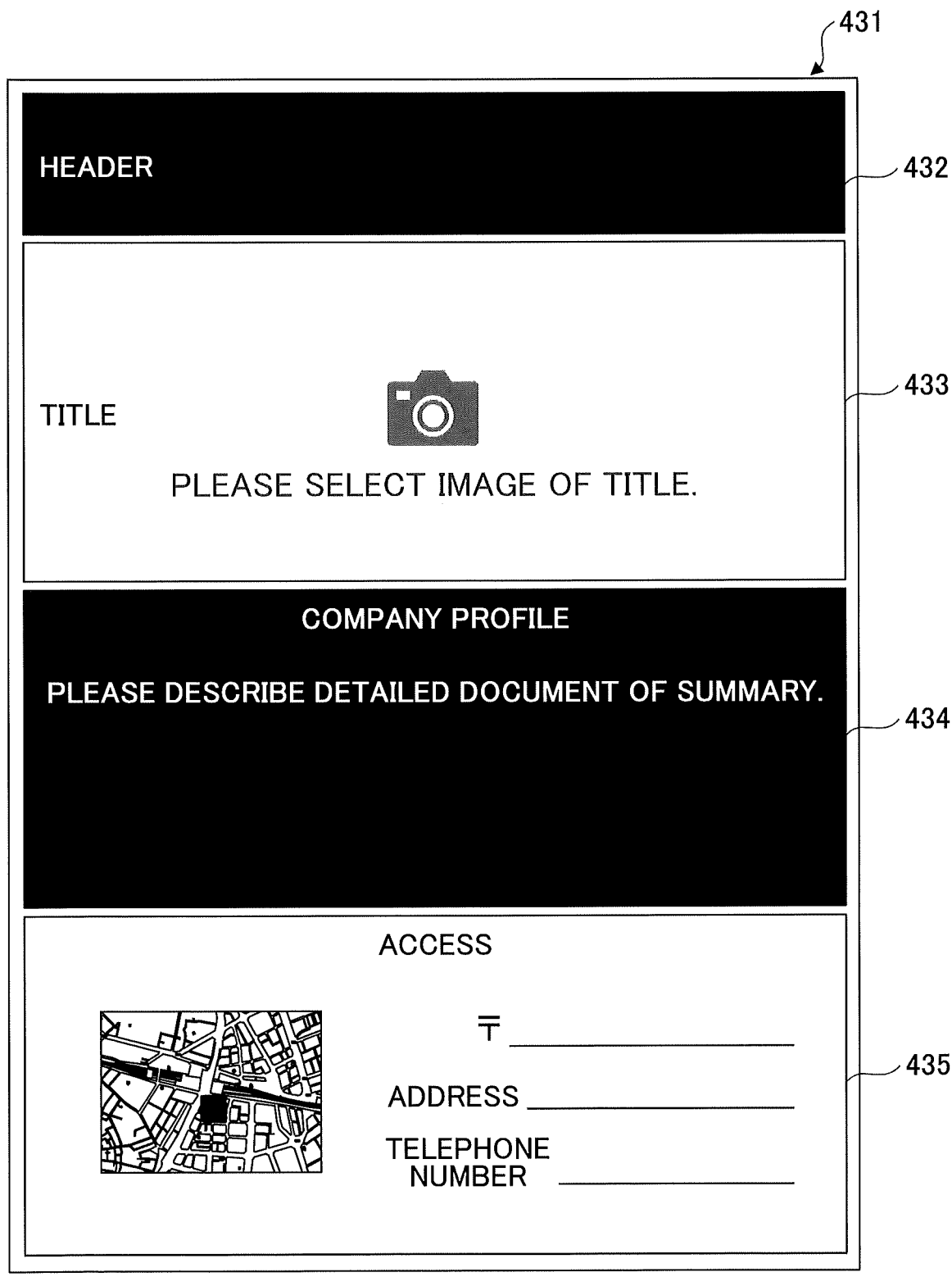
FIG. 13 illustrates an example of the template screen of an HP template.

Next, an HP template created from the parameter for creating the template will be described with reference to FIG. 13. FIG. 13 is a diagram illustrating an example of the template screen (Part 1) of the HP template. The template screen (1) 431 in FIG. 13 contains the content of the header field 432, the title image field 433, the Company Profile field 434, and the access field 435 as an example of the HP template that is commonly used regardless of the commodities or services. These are content that is commonly used for any commodities or services. The CMS server 20 creates an HP template, such as that illustrated in FIG. 13, regardless of the parameter for creating the template. In addition, the user 9 can appropriately select the color scheme of the HP template, the position and size of the photograph, the size of characters, and the like. This is the same for each template screen.

When the template screen (1) 432 as illustrated in FIG. 13 is displayed on the user terminal 13, the user 9 enters images and characters into the header field 432, the title image field 433, the company profile field 434, and the access field 435, respectively. The operation reception unit 22 of the user terminal 13 receives these entries and the HP template is completed. The first communication unit 21 sends the HP template with the content entered to the CMS server 20. That is, the user terminal 13 directly communicates with the CMS server 20 to complete the HP.

Figure 14:
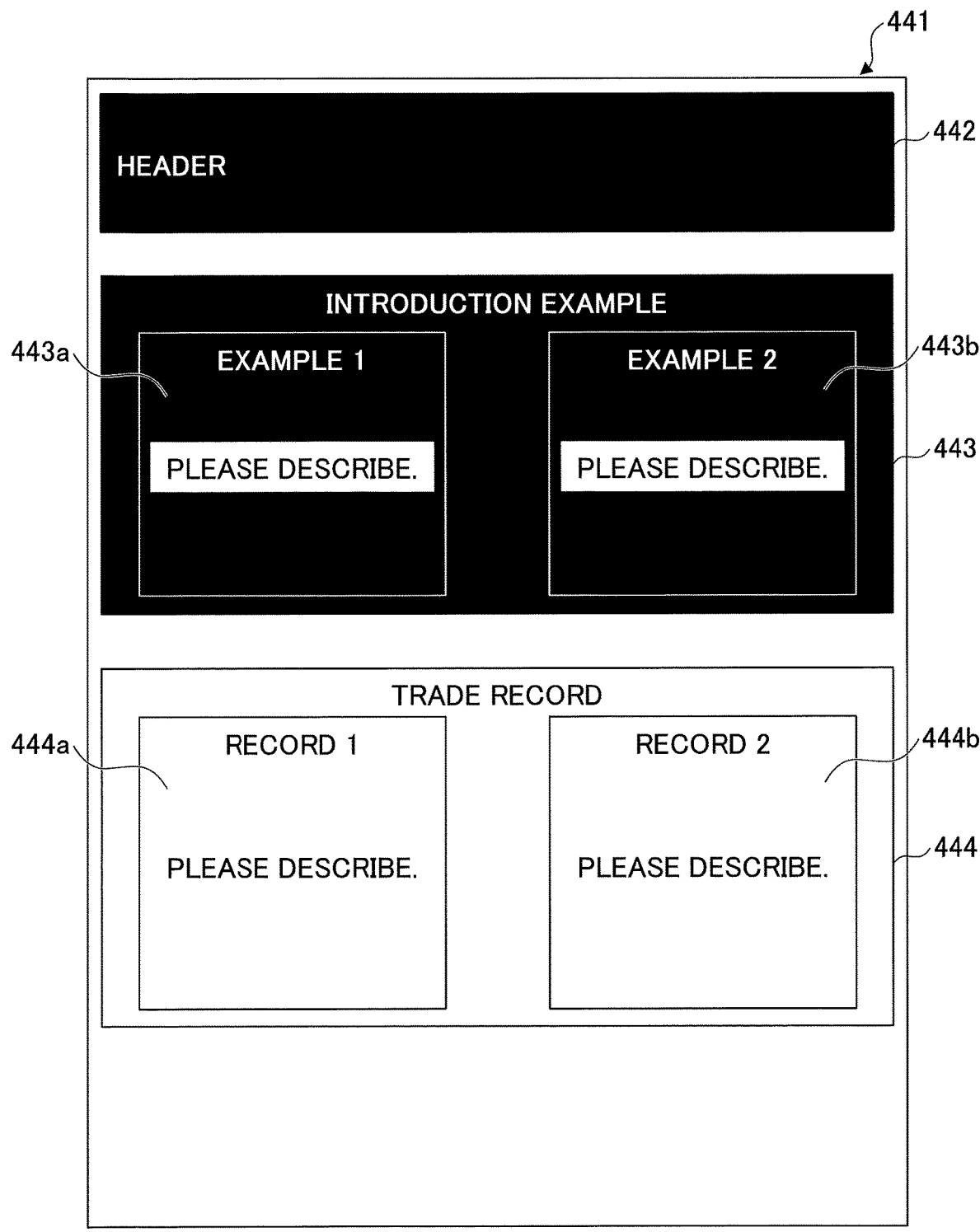
FIG. 14 illustrates another example of the template screen of the HP template created from a template creation parameter.

FIG. 14 is a diagram illustrating an example of the template screen (part 2) 441 of the HP template created from the parameter for creating the template. The template screen (part 2) 441 in FIG. 14 is an example of an HP template created from the parameter for creating the template determined by automatic consultation. The template screen (part 2) 441 has a header field 442, an introduction example field 443, and a trade record field 444. The CMS server 20 creates an HP template, such as that illustrated in FIG. 14, depending on the parameter for creating the template. In other words, the user 9 selected the introduction example and the trade record for the content category to be posted on the HP through automatic consultation.

In the introduction example field 443, there are two case entry fields 443*a* and 443*b* as an example, and in the trade record field 444, there are two case entry fields 444*a* and 444*b* as an example. The user 9 enters images and characters in the introduction example field 443 and the trade record field 444, respectively. The header field 442 is not required to be entered because it is common to one HP, but a different header may be entered. The operation reception unit 22 of the user terminal 13 receives these enters and the HP template is completed. The first communication unit 21 sends the HP template in which the content is entered to the CMS server 20.

Next, an inquiry form corresponding to the content will be described with reference to FIG. 15. The inquiry form often becomes more important in automatic consultation. The user 9 may also select the inquiry form as a content category. However, there are appropriate types of inquiry forms depending on the content of the inquiry. Therefore, the HP template creating unit 42 according to the present embodiment sets the inquiry form corresponding to the parameter for creating the template determined by the automatic consulting to the HP template.

Figure 15A:
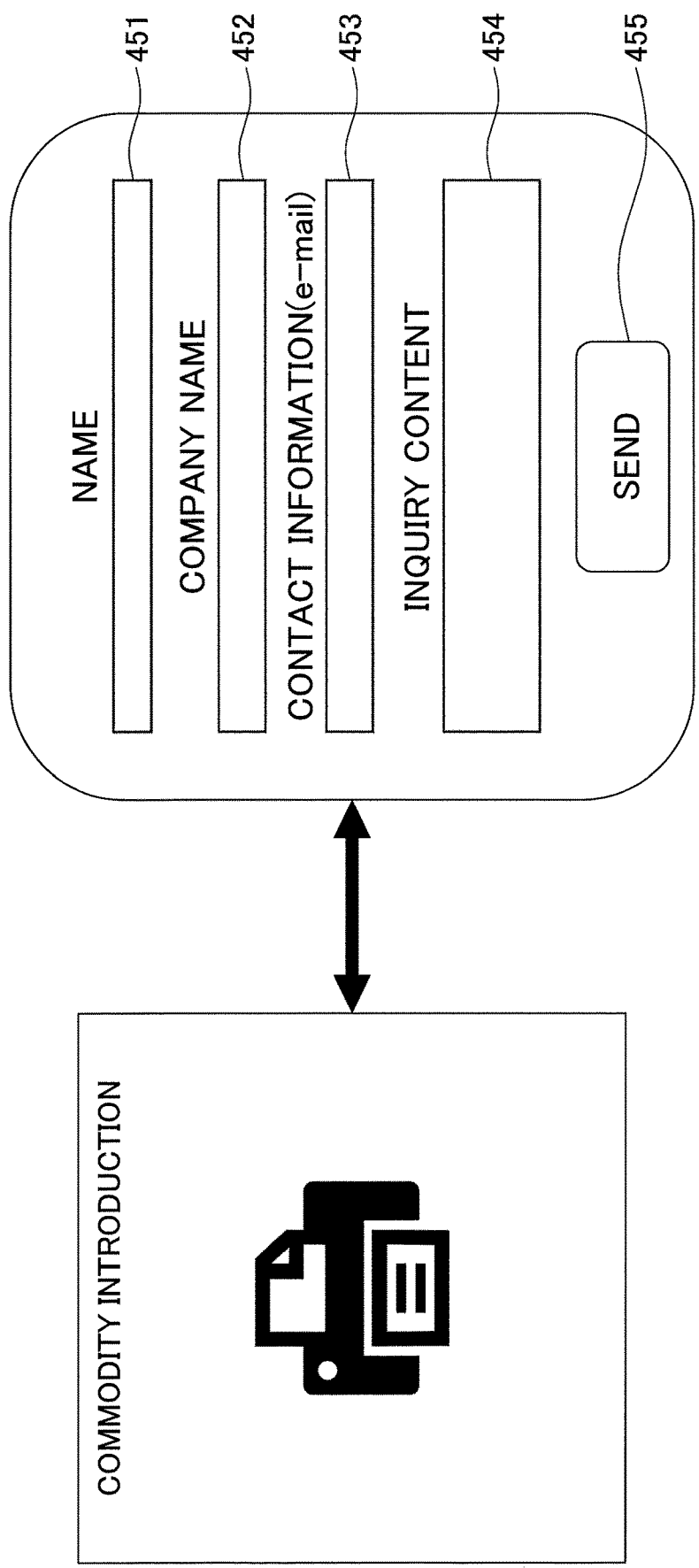

FIGS. 15A and 15B illustrate example of different types of inquiry form. FIG. 15A is an inquiry form for the commodity introduction, and FIG. 15B is an inquiry form for employment information.

As illustrated in FIG. 15A, the inquiry form for the commodity introduction includes a name field 451, a company name field 452, a contact field 453, an inquiry content column 454, and a send button 455. As illustrated in FIG. 15B, the inquiry form for employment information includes a name field 461, a subscription type field 462, a contact field 463 and a send button 464. Thus, the HP template creating unit 42 automatically generates an inquiry form according to the importance bar of content determined by the automatic consultation and sets it to the HP template.

Therefore, the user 9 does not need to modify or modify the inquiry form depending on whether the product introduction or the hire information, and can use an HP template with an appropriate type of inquiry form for the inquiry form content.

<Example Code of Form>

Although there are several ways to create an inquiry form, this embodiment describes how the developer can enter and edit code and how to use the form creation Web service.

<Developer Enters or Edits Code

In the inquiry form illustrated in FIG. 15, the browsing person enters the query. In the case of FIG. 15A, the name is entered in column 451, the company name is entered in the company name field 452, the contact information is entered in the contact field 453, and the inquiry content is entered in the inquiry content field 454. In the case of FIG. 15B, the name is entered in a name field 461, a subscription type is entered in a subscription type field 462, and contact information is entered in the entry in column 462, and the contact information field 463. The inquiry content must be sent to a person or a department in charge of the company to which user 9 belongs. Hereinafter, an example of embedding a destination mail address for the HP open server 60 to send the inquiry content entered to the MA server and the MA identification information for sending the inquiry content to the MA server will be described. FIGS. 16A and 16B are an example of a diagram illustrating an example of embedding a send destination mail address and MA identification information for an HP template.

FIG. 16A illustrates an example of the HP template code for the inquiry form. FIG. 16A illustrates an example of code when the inquiry form illustrated in FIG. 15A is written in HTML. First, the form tag is specified in a description 1. The form tag is a tag that sends a value entered in a form part such as an entered tag to the destination specified by the action attribute. The destination of description 1 is "/my-handling-form-page". The method attribute designates the HTTP method to be used when sending the inquiry content. Usually post or get. The id attribute is the identifier of the form within the page. In the present exemplary embodiment, it may be set so that the entire home page does not overlap.

A description 2 is a code that realizes a name field 451, which designates that the label tag displays the name and that the input tag displays the text entry field with the type attribute. The id attribute is identifying information for data processing and is specified when the scripting language or CSS refers to it. The name attribute is identifying information in the name field sent along with the inquiry content and is used by a person to determine. Descriptions 3-5 are similarly codes that implement the company name field 452, the contact field 453, and the inquiry content field 454.

A description 6 provides for displaying a send button 455. A type attribute designates sending (submission), and the value attribute designates a character to be displayed.

According to the example code illustrated in FIG. 16A, when the browsing person enters the inquiry content into the inquiry form and clicks the send button 455, the inquiry content entered into the inquiry form is sent to "/my-handling-form-page". This description is in the form of a relative URL, in which queries are sent to the "/example.com/hoge" URL of the HP open server 60.

In the present embodiment, at least one of the user 9 or the MA server 40 requires an inquiry content, and thus a <INPUT> tag is used, for example, as illustrated in FIG. 16B. This allows the destination to be arbitrarily specified. The <INPUT> tag is an HTML tag.

The tag form embedding 43 embeds a code such as that illustrated in FIG. 16B. The embedded destination may be, for example, in <form>-<form>, for example, just before the </form> tag. FIG. 16B illustrates the <INPUT> tag for sending inquiry content to the user 9 and the <INPUT> tag for sending inquiry content to the MA server 40.

Descriptions 7 and 8 in FIG. 16B are input tags, but they are not displayed on the inquiry form because the type attribute is hidden. The name attribute is the same as above. The value attribute indicates the destination of the inquiry contents. In Description 7, a destination mail address (suzuki@sample.co.jp, yamada@sample.co.jp) for the user is embedded, and in Description 8, a MA identifier (massystem.com/aaa) for the MA server 40 is embedded. Both are addresses for inquiry content.

In addition, the value attribute in description 8 states "userID="company A". This is the user ID indicating the company to which the user 9 belongs. That is, when the inquiry content is transmitted, by transmitting the identification information of the company to which the user 9 belongs to the MA server 40, the MA server 40 can determine which company is the inquiry. The tag form embedded portion 43 embeds a user ID with MA identification information.

The tag/form embedding unit 43 of the CMS server 20 thus embeds in the HP templates an HTML tag in which the HP open server 60 emails the inquiry content to the suzuki@sample.co.jp and yamada@sample.co.jp and sends the MA information of company A to the massystem.com/aaa address of the MA server 40.

The destination mail address (suzuki@sample.co.jp, yamada@sample.co.jp), the user ID (userID="company A"), and the identification information (masystem.com/aaa) of the MA server 40 are sent from the support server 50 to the CMS server 20. These are automatically selected by the user 9 logging in to the support server 50. That is, it is assumed that the user 9 has set the support server 50 beforehand. However, the user 9 may optionally change one or more of the destination information, the user ID, and the identification information of the MA server 40. For example, if there are multiple CMS servers 20 and MA servers 40, the user 9 may select the desired CMS server 20 and MA server 40. In this case, the tag/form embedding unit 43 embeds the identification information of the MA server 40 selected by the user 9.

In FIG. 16, the destination mail address, the user ID, and the identification information of the MA server 40 are embedded in the HTML tag, but these may be embedded in the JavaScript (registered trademark).

Figure 17:
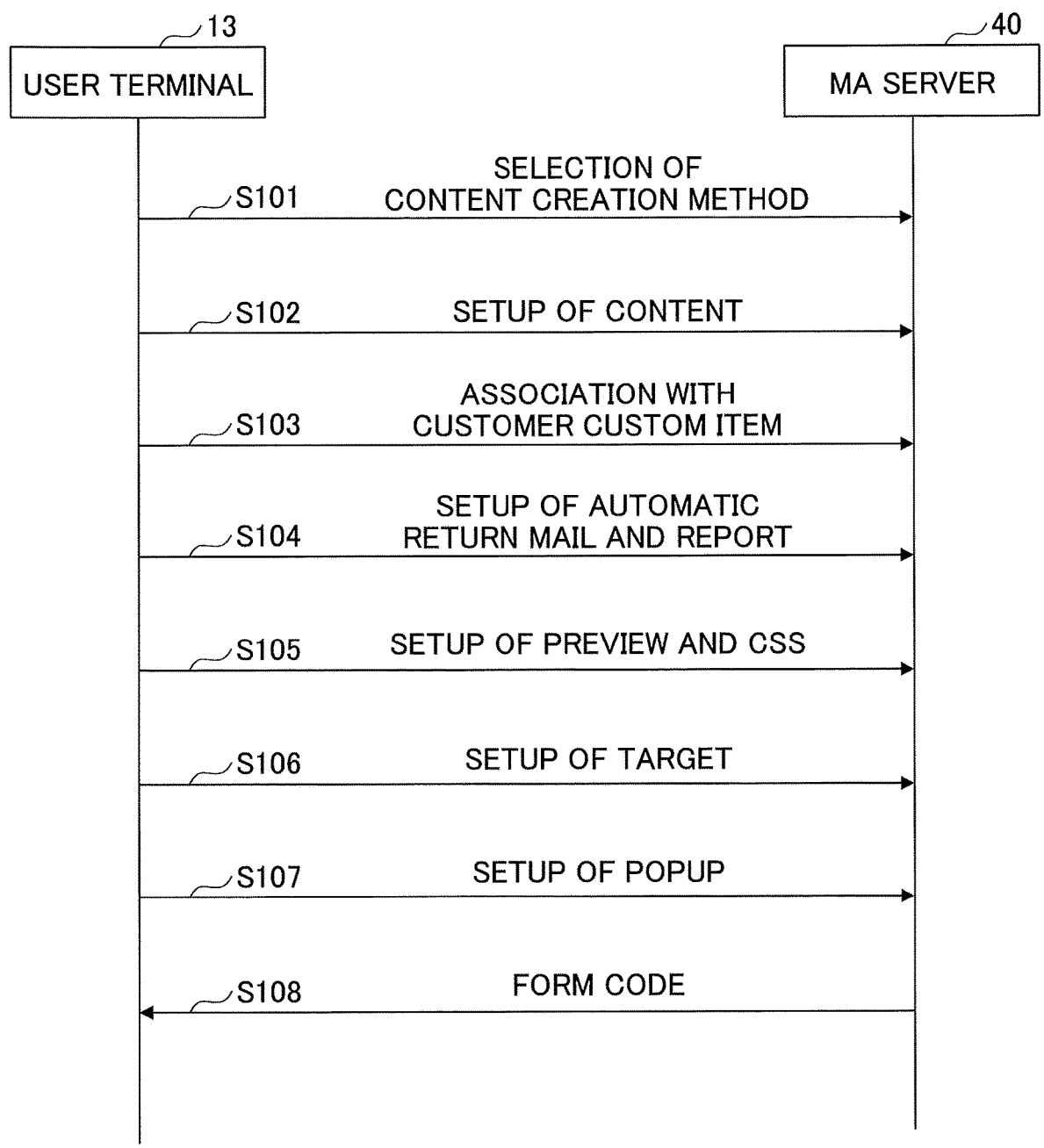
FIG. 17 illustrates an example of a procedure for a developer to create a form using the form creation web service.

How to use the forms creation web service FIG. 17 illustrates the process by which a developer creates a form using the form creation web service. In this embodiment, although the MA server 40 provides a form creation web service, the form creation web service may be provided by other servers.

S101: The developer selects the content creation method from the user terminal 13, and the operation reception unit 22 accepts the content creation method. The first communication unit 21 sends the content creation method to the MA server 40. Content creation methods include pop-ups and embedding. A pop-up is a pop-up form, and an embedded embedment is a form that can be embedded anywhere.

S102: Next, the developer sets the content. For example, the "form part name", "information acquisition route", "confirmation screen", etc. are set up. The operation reception unit 22 receives the content setup, and the first communication unit 21 sends the content setup to the MA server 40. The "form part name" is an identifier of the form. When there is an input from a form to be created to the "information acquisition route" the "information acquisition route" to be given to the browsing person who has entered. The default value is "form part name". The "confirmation screen" is the setup for whether to allow the browsing person to display the confirmation screen for the entered contents. In addition, the name, e-mail address, department name, and phone number of the browsing person can be set.

S103: Next, the user sets an association with a customer custom item. That is, while a step S102 is a common setup with respect to the form, the user can set up his own form specific items. Information may be provided to identify the commodity name or service to which the inquiry form relates. It is also possible to set up which information (text data, numeric values, dates, prefectures, etc.) to be entered. The operation reception unit 22 receives the setup of the customer custom item setup, and the first communication unit 21 sends the content setup to the MA server 40.

S104: Next, the user performs automatic reply mail and notification setup. The automatic reply mail is the setting of sending or not sending the inquiry information entered by the reader automatically to the e-mail address entered by the reader. A template of the automatic reply mail can also be set. A notification setup is used to notify the MA server, etc., and MA identification information, etc. is set. The operation reception unit 22 receives the automatic reply mail and the notification setup, and the first communication unit 21 sends the content setup to the MA server 40.

S105: Next, the user enters preview and CSS settings. The preview and CSS settings are for the design of the form. A preview of the form is displayed, the arrangement of the items and color distribution may be changed into any style. The operation reception unit 22 receives the preview and CSS settings, and the first communication unit 21 sends the content setups to the MA server 40.

S106: Next, the user enters the target setup. A target is a segment (or target) that displays a form. A segment of the browsing persons can be identified from cookies and the like. You can target all customers and configure the form to be displayed and hidden depending on attributes. The operation reception unit 22 receives the target setting, and the first communication unit 21 sends the content setup to the MA server 40.

S107: Next, the user performs a pop-up setup. The popup setup is to set up the timing and the location of the display. The pop-up setup is set when the pop-up is selected in step S101. For example, the following setup can be set: when a browsing person opens a website and scrolls a predetermined amount of scrolling, when a button is pressed, when a setup time has elapsed, etc.

S108: Because the form creation reception unit 54 of the MA server creates the form code based on the above setups, the sixth communication unit 51 of the MA server sends the form code to the support server 50.

FIG. 18 is an example of a form code. The tag form embedding 43 embeds the form code at any location (within a <body> tag) on the home page where the user wishes to display the form. Because the form is created by the MA server 40, the form code contains MA identification information. The destination of the query is the MA server. When a home page with embedded form code is opened by the browsing person, the form code is executed and a browsing person terminal 14 displays the form generated by the form code on the home page. In Step S104, the MA server 40 is input as a destination mail address and a notification destination for the user illustrated in FIG. 16b.

<For MA Tags>

Next, the MA tag will be described with reference to FIGS. 19A and 19B. FIG. 19A illustrates an example of a MA-tag written in a scripting language. The MA tag is a tag for transmitting the PV number to the MA server 40. "m="company A, 12345678"" in a description 11 is the user ID and MA tag identification number.

The user ID may be hashed in consideration of security.

In a description 11, "function(m,src)" is defined with (m,src) as the argument, and "src=https://example.com/hoge" indicates the current page, indicating which part of the company's HP the browsing person viewed.

The "https://masystem.com/mts.js" in a description 12 is a library of JavaScript (JavaScript is a "registered trademark" opened by the MA server 40. The address of the MA server 40 is defined in this library, and the method (function) called "mt" is defined. The tag/form embedding unit 43 designates a library that is pre-associated with the MA identification information.

From among the parameters mt ('send', 'pageview') in the description 13, "send" means to send information to the MA server 40, and "pageview" means that a sending object information is "PV". When the "mt" method is executed, the PV information is sent to the address of the MA server 40 pre-registered in the "https://masystem.com/mts.js" library. The MA tag can be created by the tag/form embedding unit 43 based on the MA identification information because the user ID and MA identification number, if any, are common phrases.

The HP open server 60 is only one example in which a PV is sent to the MA server 40 and can also transmit CV (conversion) and cookies or the like. Further, the cookie can be used to determine the identity of the browsing person, count the number of browsing, and transmit to the MA server 40. The conversion refers to the achievement of HP's goals, and the lead nurturing refers to the number of inquiries and the number of requests for documents.

FIG. 19B illustrates an example of an analysis service tag. The configuration of the analytical service tag may be the same as that of the MA tag, but the description 12 "'https://gaanalytics.com/gas.js'" is a library of JavaScript ("JavaScript" is a registered trademark) opened by the analysis server 80. The address of the analysis server 80 is defined in this library, and a method (function) called "ga" is defined. When the "ga" method is executed, the PV information is sent to the address of the analysis server 80.

As described above, because the analysis service tag is issued from the analysis server 80, the tag/form embedding unit 43 of the CMS server 20 embeds the analysis service tag in the home page with the analysis server 80. The analysis service tag may be acquired by the user or by the support server 50.

FIG. 20 illustrates an example of browsing information sent when the MA tag is executed. The browsing information of FIG. 20A is the number of PVs per day for one of the HPs disclosed by the HP open server 60. ""uri": https://example.com/hoge" is a page where PV is counted. ""date": "2018-06-12" is the PV count date and ""pv":"3235"" is the PV count.

The browsing information in FIG. 20B is the number of PVs, inquiries, and CVs for the entire half year of HP. The ""domain":"example.com"" is the domain of HP. ""term": "2018-01-01-2018-06-30"" indicates the period (six months). ""pv":"423514" indicates the number of PVs. "Contact": "3453" is the number of views of HP. ""cv": "242" is the number of CVs (e.g., the number of queries).

The browsing information sent to the MA server 40 and the browsing information sent to the analysis server 80 may be different or the same. In this embodiment, appropriate browsing information is sent for each.

<MA Information Browsed by User>

Figure 21:
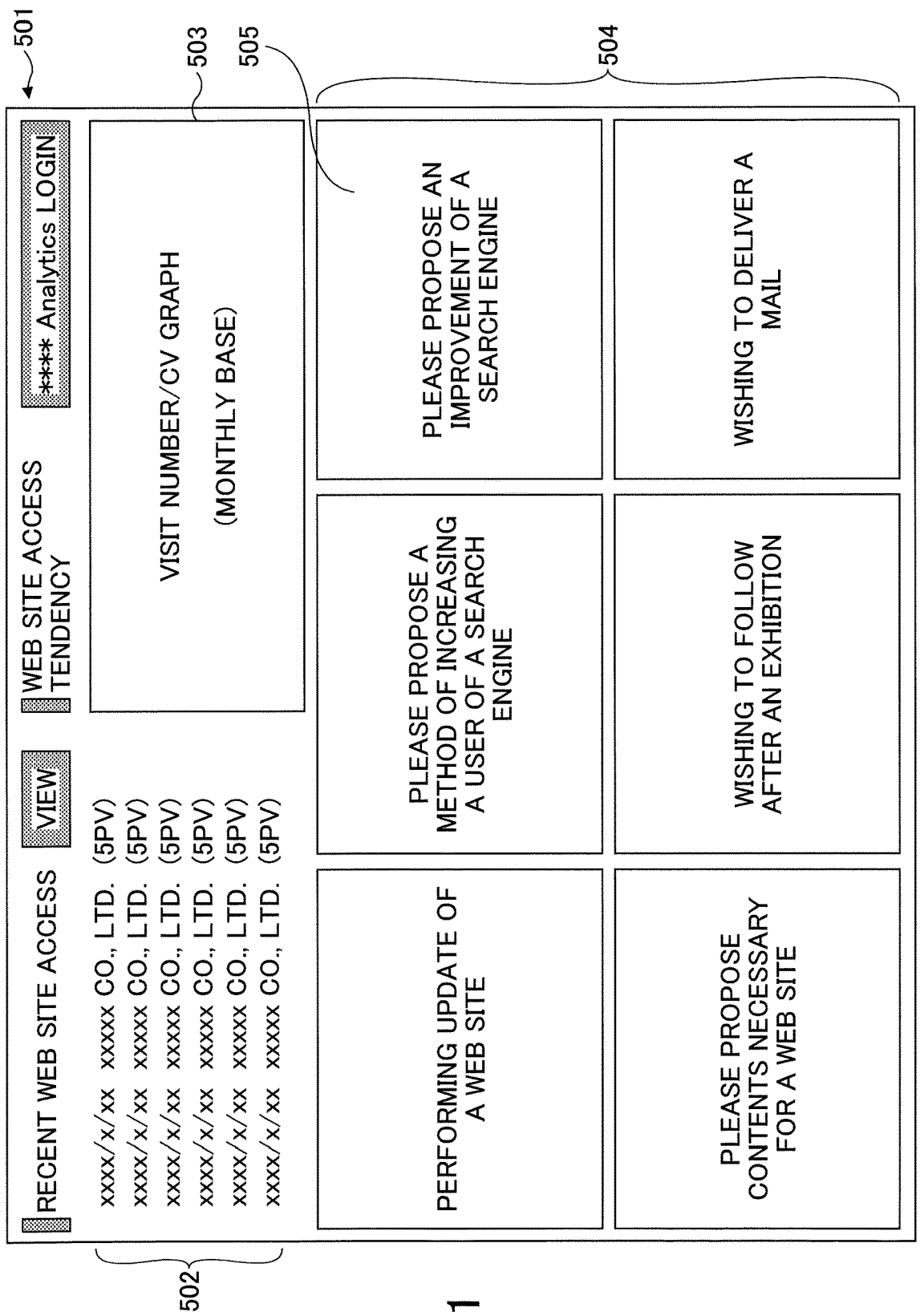
FIG. 21 illustrates an example of the MA information screen displayed on the display device when the user terminal communicates with the support server.

Next, the MA information browsed by the user 9 will be described with reference to FIG. 21. FIG. 21 illustrates an example of the MA information screen 501 in which the user terminal 13 communicates with the support server 50 and displays the display device 202. The MA information screen 501 includes a WEB site access number field 502, a Web site access tendency field 503, and other operation buttons 504.

The number of Web WEB site access number field 502 illustrates the company name of the company that recently accessed the HP. PV (page view) is the number of times each company viewed the HP. The PV can be counted, for example, by the HP open server 60 sending cookies to the browser. The web site access tendency field 503 illustrates the number of views and CVs graphically.

Other work buttons 504 display various buttons corresponding to the various service content provided by the support server 50 regarding the HP. The user 9 may also, for example, update the HP from the operation button 504.

<Improvement of Home Page>

Figure 22:
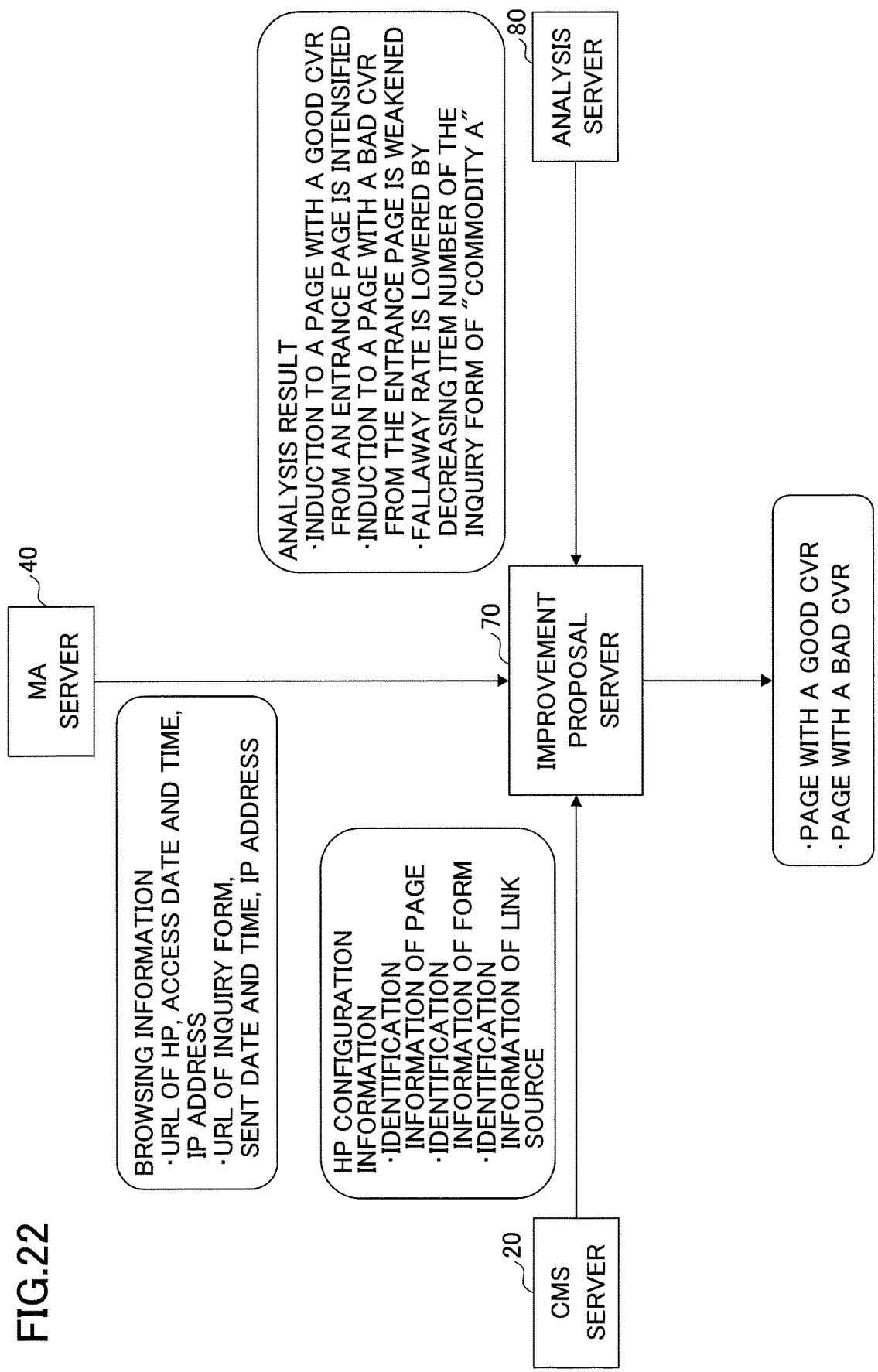
FIG. 22 is a diagram illustrating an outline of the creation of improvement information by the improvement proposal server.
Figure 23:
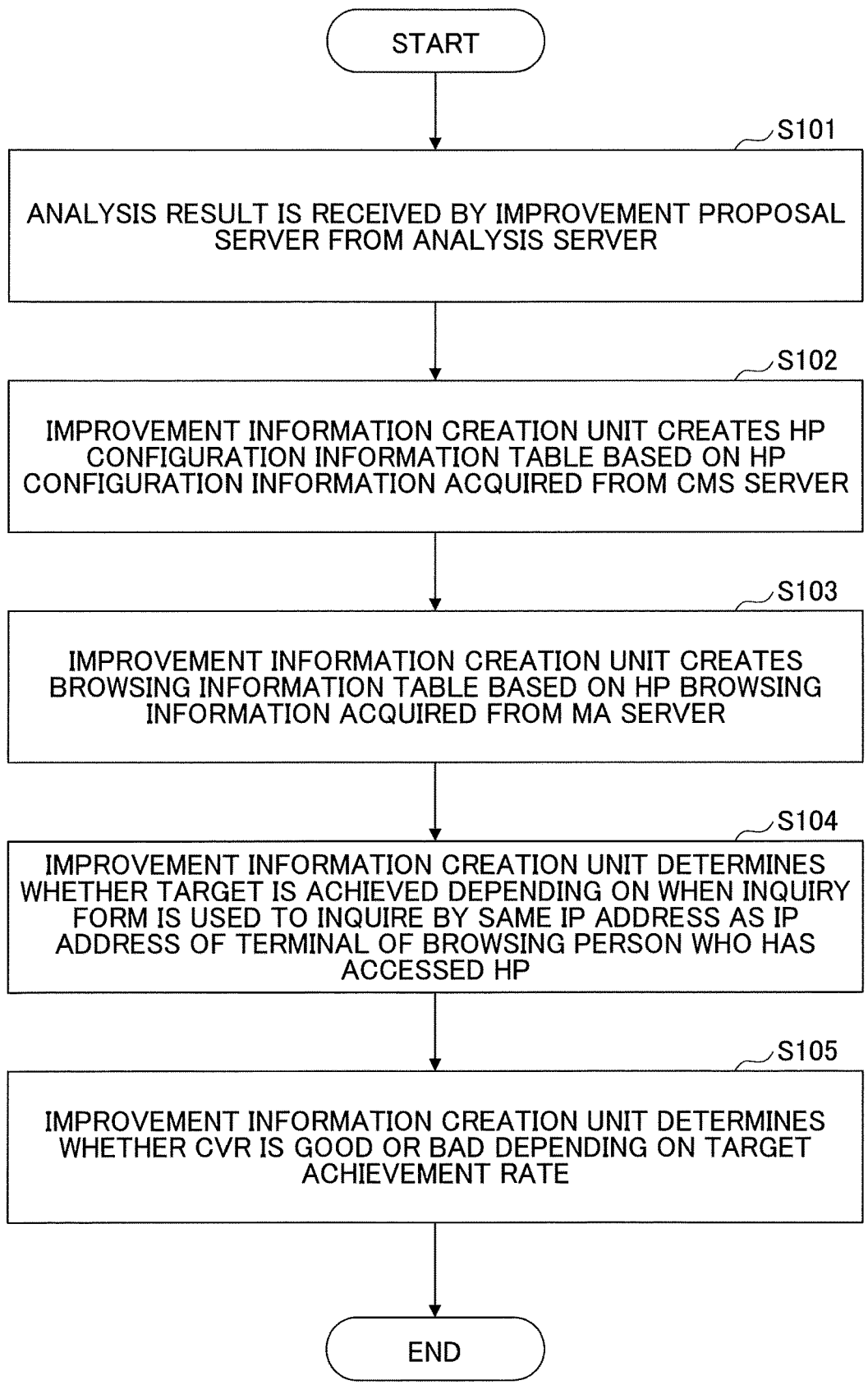
FIG. 23 is a flowchart illustrating an example procedure in which an improvement information creation unit calculates a CVR.

A calculation of CVR and generation of improvement information will be described with reference to FIGS. 22 and 23. FIG. 22 is a flowchart illustrating an outline of the creation of the improvement information by the improvement proposal server 70, and FIG. 23 is a flowchart illustrating an example procedure in which the improvement information creation unit 72 calculates the CVR.

As described above, the improvement proposal server 70 acquires the HP configuration information from the CMS server 20 and acquires the analysis result from the analysis server 80. The browsing information is acquired from the MA server 40. HP configuration information includes page identification, form identification, and link source identification. The browsing information includes the URL of the home page, the date and time of access, the IP address, etc., and includes the URL of the inquiry form, the date and time of submission, the IP address, etc.

Examples of the results of the analysis include "to increase the guidance from the entrance page to the good CVR page", "to reduce the guidance from the entrance page to the bad CVR page", and "to reduce the withdrawal rate by reducing the number of items in the "commodity A" inquiry form".

However, even with these vague messages, the user does not know what to do specifically, such as which page the entrance page" or "good CVR page" points to, how to modify the home page to "increase guidance", and how to operate to "reduce the number of items in the "commodity A" inquiry form".

The improvement information creation unit 72 of the improvement proposal server 70 provides the user with a more specific improvement proposal based on the ambiguous analysis result sent from the analysis server 80, the HP configuration information sent from and retained by the CMS server 20, and the browsing information sent and retained by the MA server 40. Specifically, the improvement information creation unit 72 can reach the URL of the "entrance page" of the HP created by the user or the URL of the "inquiry form of a specific product" by using the retained HP configuration information. The improvement information creation unit 72 retains the browse information sent from the MA server 40 and calculates the CVR of each page using the browse information. This allows you to identify pages with good CVR and bad CVR.

The users may set good CVR pages and bad page criteria. Alternatively, it may be predetermined.

TABLE 2

| CVR calculation table | |
|---|---|
| A co., ltd. | |
| CVR standard | target is achieved if there is inquiry of the commodity within 1 hour after browsing commodity page |
| page with good CVR | target achievement rate is 10% or smaller |
| page with bad CVR | target achievement rate is smaller than 0.5% |

Table 2 illustrates an example of a CVR calculation table. The CVR calculation table has a CVR criteria, a page with a good CVR, and a page with a bad CVR. The CVR standard is a standard for determining whether a browsing person has achieved the goal of applying for the home page.

Hereinafter, an explanation will be made based on FIG. 23.

(S101)

An analysis result reception unit 75 acquires an ambiguous analysis result from the analysis server 80 as described above. The URLs (page identification information) of the pages "Enhance the guidance of good CVR pages from the entrance pages" and "Decrease the guidance of the page with the bad CVR from the entrance page" and the URLs (page identification information) of the "Decrease the number of items in the "commodity A" inquiry form" and other forms (page identification information) are sent to the improvement proposal server 70.

(S102)

The improvement information creation unit 72 creates the HP configuration information table based on the HP configuration information acquired from the CMS server 20.

TABLE 3

| HP configuration information | |
|---|---|
| A co., ltd. | |
| entrance page | http://company-a/top.html |
| commodity introduction page: commodity A | http://company-a/product/a.html |

TABLE 3-continued

| HP configuration information | |
|---|---|
| A co., ltd. | |
| commodity introduction page: commodity B | http://company-a/product/b.html |
| inquiry form: commodity A | http://company-a/form/a.html |
| inquiry form: commodity B | http://company-a/form/b.html |
| . | . |
| . | . |
| . | . |

Table 3 schematically illustrates an example of the HP configuration information table. The HP configuration information table is associated with the entrance page and holds the URL. Each URL of the entrance page, product introduction page, and inquiry form is automatically set by the improvement proposal server 70 by analyzing the HP configuration information (e.g., analyzing the URL and registering the URL with the shortest path in the URL of the entrance page). Alternatively, the improvement proposal server 70 may analyze the HP configuration information and allow the user to select (e.g., analyze the URL to extract the URL that is likely to be the entrance page and display a view to allow the user to select the URL). Alternatively, the user may set based on the HP configuration information (for example, a UI screen containing a view of URLs based on the HP configuration information is displayed, and the user selects the URL of the entrance page from the view of URLs on the UI screen).

(S103)

Next, the improvement information creation unit 72 prepares the browsing information table based on the browsing information acquired from the MA server 40. The improvement information creation unit 72 retains the following browse information table based on the browse information sent from the MA server 40.

TABLE 4

| (a) browsing information table 1 | | |
|---|---|---|
| A co., ltd. | | |
| URL | access time and date | IP address |
| http://company-a/product/b.html | 2019/02/22 16:30:00 | 111.111.111.111 |
| http://company-a/product/b.html | 2019/02/25 18:00:00 | 222.222.222.222 |
| http://company-a/product/b.html | 2019/02/26 15:20:00 | 333.333.333.333 |
| . | . | . |
| . | . | . |

| (b) browsing information table 2 | | |
|---|---|---|
| A co., ltd. | | |
| inquiry form | send time and date | IP address |
| http://company-a/form/b.html | 2019/02/22 16:37:00 | 111.111.111.111 |
| http://company-a/form/b.html | 2019/02/26 09:00:00 | 222.222.222.222 |
| . | . | . |
| . | . | . |

In Table 4, (a) illustrates an example of the browsing information table 1. The browsing information table 1 includes the URL of the home page, the access date and time (an example of time information), and the IP address. The date and time of access is the date and time when the browsing person accessed the home page, and the IP address is the IP address of the browsing person terminal 14. Table 4(b) illustrates an example of the browsing information table 2. The browsing information table 2 includes the URL of the inquiry form, the date and time of submission (an example of time information), and each item of the IP address. The sending date and time is the date and time when the browsing person terminal 14 sent the inquiry contents, and the IP address is the IP address of the browsing person terminal 14.

(S104)

The improvement information creation unit 72 determines whether the goal of the page has been achieved by determining when the same IP address as the IP address of the browsing person terminal 14 that accessed the pages and when the inquiry form has been contacted. The goal is to send out a form of query. Accessed pages are those with good CVR pages acquired from the analysis server 80, bad pages, and product identifiable forms.

The improvement information creation unit 72 designates the URL of the product page corresponding to the URL of the inquiry form, retrieves access to the specified URL within one hour before the inquiry is sent, and determines that the target is achieved if access is from the same IP address as the IP address of the inquiry source.

For example, according to Table 4, the IP address "111.111.111.111" is accessed to "http://company-a/product/b.html" at "2019/02/22 16:30:00". Then, seven minutes later, "2019/02/22 16:37:00" contains an inquiry for the same IP address "111.111.111.111" to "http://company-a/form/b.html". In this example, the improvement information creation unit 72 determines that the target is achieved because 7 minutes before the query is transmitted, there is access from the same IP address as that of the query source.

On the other hand, the IP address "222.222.222.222.222" is accessed to "http://company-a/product/b.html" at "2019/02/25 18:00:00". Then, nine hours later, at "2019/02/26 09:00:00", there is an inquiry for the same IP address "222.222.222.222" to "http://company-a/form/b.html". In this example, 9 hours before the query is sent, the target is not achieved because the access from the same IP address as the query source exceeded the CVR standard by 1 hour.

Furthermore, the IP address "333.333.333.333" to "http://company-a/product/b.html" was accessed at "2019/02/26 15:20:00", but because there was no query for "http://company-a/form/b.html" from the same IP address "333.333.333.333.333", the target was not achieved.

(S105)

The improvement information creation unit 72 determines the good and bad CVR according to the target achievement ratio. Because each access to the same page determines whether the target is achieved, the target achievement rate is calculated based on the number of accesses or the number of times the target is achieved for a certain period of time. By comparing this with the CVR criteria (thresholds) in the CVR calculation table in Table 2, the good and bad CVR can be determined. The information whether the CVR is above or below the CVR standard (threshold value or above) is sent to the user terminal 13 as improvement information corresponding to the page.

As described above, the improvement information creation unit 72 calculates the CVR for each product page and can designate whether each product page has a good CVR page or a bad CVR page based on the criteria of the good CVR page and the bad CVR page.

Further, it is sufficient to calculate whether the page has good CVR or bad CVR based on the IP address of the browsing person terminal 14 in order to obtain high accuracy. However, when it is impossible to obtain the IP address of the browsing person terminal 14 or when it is not necessary to obtain high accuracy, the IP address is not required. For example, use information that identifies the browsing person, such as cookies.

In addition, the user may set the correspondence between the product page and the product inquiry form through a predetermined screen (interface), or the improvement proposal server 70 may automatically make a decision (for example, the URL of the product page is http://company-a/product/b/info.html, and if the URL of the product inquiry form is http://company-a/product/b/form.html, the root URL "http://company-a/product/b/html" is common, so it is judged to be compatible) or the improvement proposal 70 may automatically determine the URL and set the user.

The CVR may be calculated at a predetermined timing. For example, the time may be calculated daily at a predetermined time on the improvement proposal server 70, or the user may set the time and interval to calculate the time and interval at a predetermined time and for each set interval. In addition, the calculation may be performed according to the user's clicking "Propose improvements to the Web site" 505 in FIG. 21.

The support server 50 provides the user with the improvement information illustrated in FIG. 22 through the above-described process. It also provides a URL for editing pages and forms, allowing users to improve their home pages without being able to analyze the results.

Figure 24:
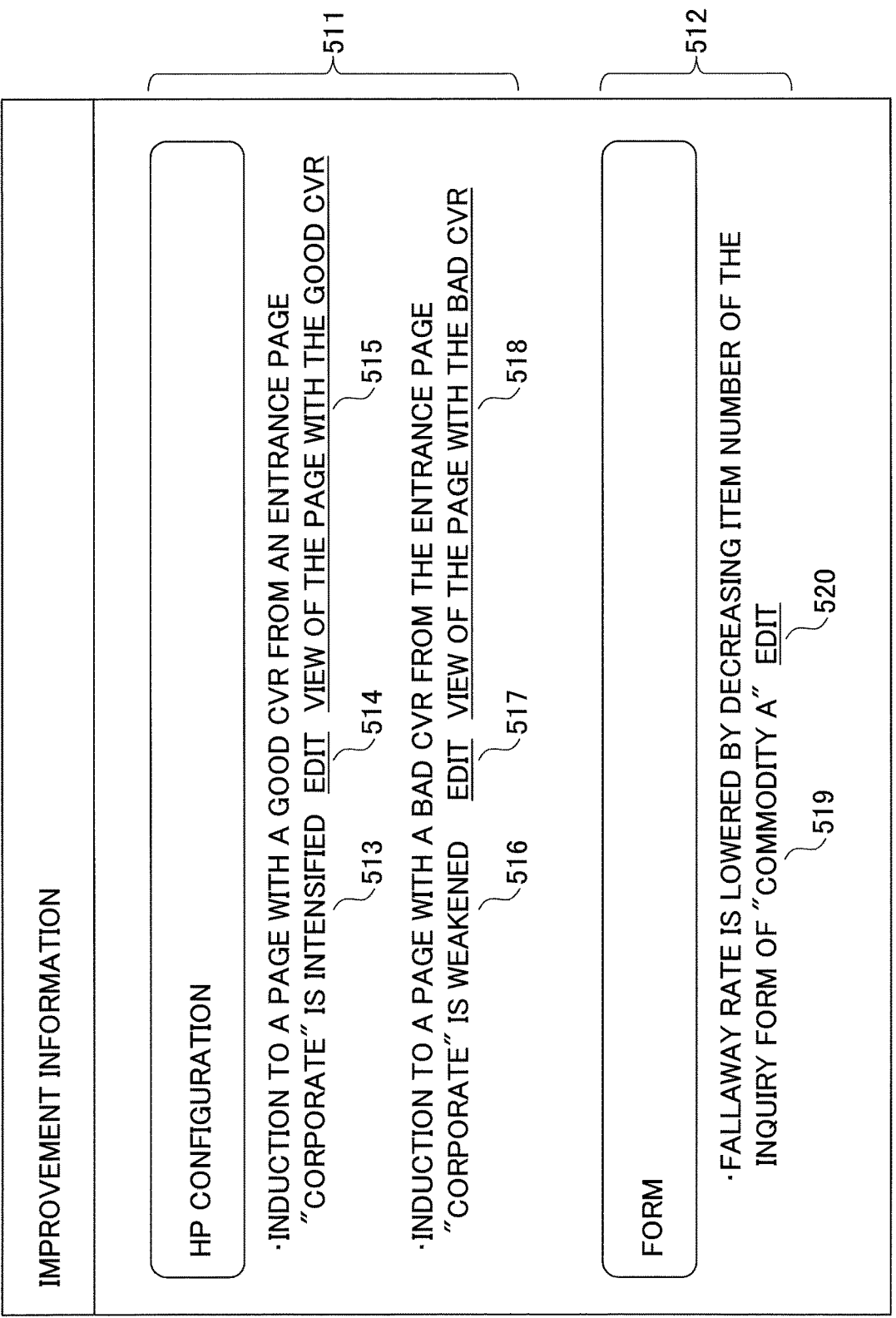
FIG. 24 is a diagram illustrating an example of an improvement proposal screen.

FIG. 24 illustrates an example of the improvement proposal screen 510. When the user touches "Propose improvements to the web site" 505 of the MA information screen 501 of FIG. 21, the improvement proposals screen 510 is displayed. The improvement proposal screen 510 has an HP configuration field 511 and a form field 512. HP Configuration field 511 is the proposed improvement for the home page structure (page to page transition) and Form field 512 is the proposed improvement for the form.

In FIG. 24, the HP configuration field 511 displays an improvement proposal screen 513, an "edit" button 514, and a "view of the page with the good CVR" button 515. An entrance page is the first page viewed by the browsing person from another Web page, for example, a top page, or a page registered in a search site. The name of the entrance page (corporate) is, for example, the title of HTML.

The "edit" button 514 is embedded with the edit destination URL of the "corporate" entrance page, and the user terminal 13 can display the edit screen of the "corporate" entrance page when the "edit" button 514 is clicked by the user.

A URL requesting a good CVR page is embedded in the "view of the page with the good CVR" button 515, for example, in the improvement proposal server 70. When the user clicks the "view of the page with the good CVR" button 515, the user terminal 13 can request a good CVR page to the improvement proposal server 70 and display a good CVR page list.

The user describes the list of links to good CVR pages in the entrance page "Corporate" HTML data and JavaScript (registered trademark). Characters and buttons to be embedded in the link can be increased. It can also be set to a conspicuous location, such as moving the location of the text embedded in the link up. Such editing is easier at the low literacy level.

Proposal 516 for improvement of the "entrance page "Corporate" to reduce CVR's guidance to bad pages" includes a "Edit" button 517 and a "view of the page with the bad CVR" button 518. The "edit" button 517 is embedded with the edit destination URL of the "corporate" entrance page, and the user terminal 13 can display the edit screen of the "corporate" entrance page when the "edit" button 517 is clicked by the user.

The "view of the page with the bad CVR" button 518 includes, for example, a URL in the improvement proposal server 70 requesting a bad page of the CVR, and when the user clicks the "view of the page with the bad CVR" button 518, the user terminal 13 can request a bad page of the CVR from the improvement proposal server 70 and display the bad page list of the CVR.

The user deletes the list of CVR links to bad pages in the entrance page "Corporate" HTML data or JavaScript™. Alternatively, characters or buttons to be embedded in the link can be reduced. It can also be set to an inconspicuous location, such as letters or buttons below which links are embedded.

A form field 512 contains an improvement proposal 519 and a button 520 to "edit" to ""reduce the number of items in the "commodity A" Inquiry Form to reduce the withdrawal rate". The "edit" button 520 is embedded with the URL to which the inquiry form of commodity A is to be edited, and when the "edit" button 520 is clicked by the user, the user terminal 13 can display the edit screen of the inquiry form of commodity A. When the form is created by the MA server 40, the URL at the time of creation is the editing URL of the inquiry form of commodity A. Because each form of the HP configuration information contains the form's identity, the edition destination URL can also be identified if only the form is identified.

Further, the "product name A" is information entered by the user in the form creation web service described in FIG. 17, for example, form part name or customer custom item. Thus, the specific product name is displayed so that the user can easily determine which form to edit.

<Overall Operation>

Figure 25:
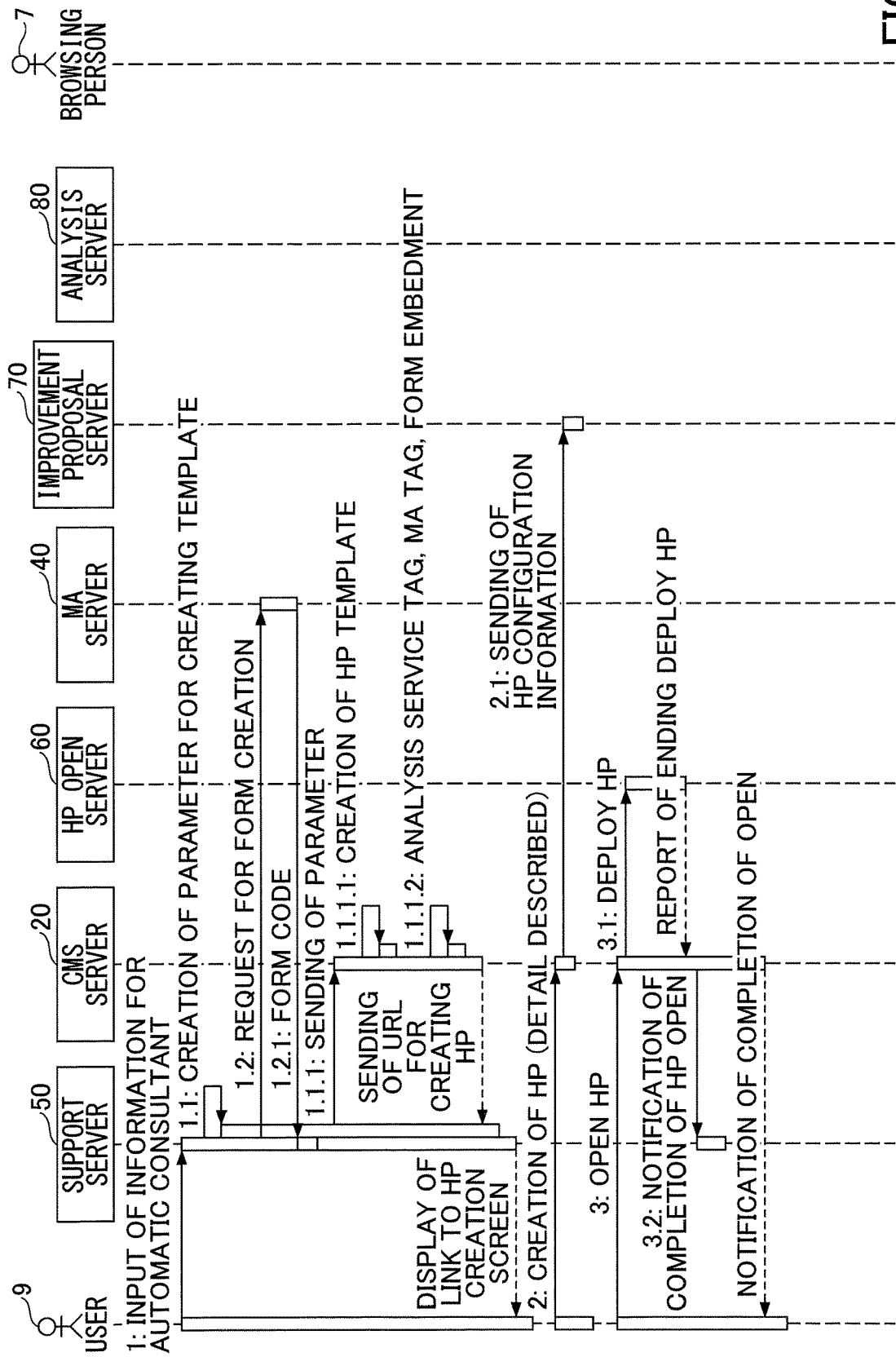
FIG. 25 is a sequence diagram illustrating an example of a procedure from automatic consulting to improvement of HP.
Figure 26:
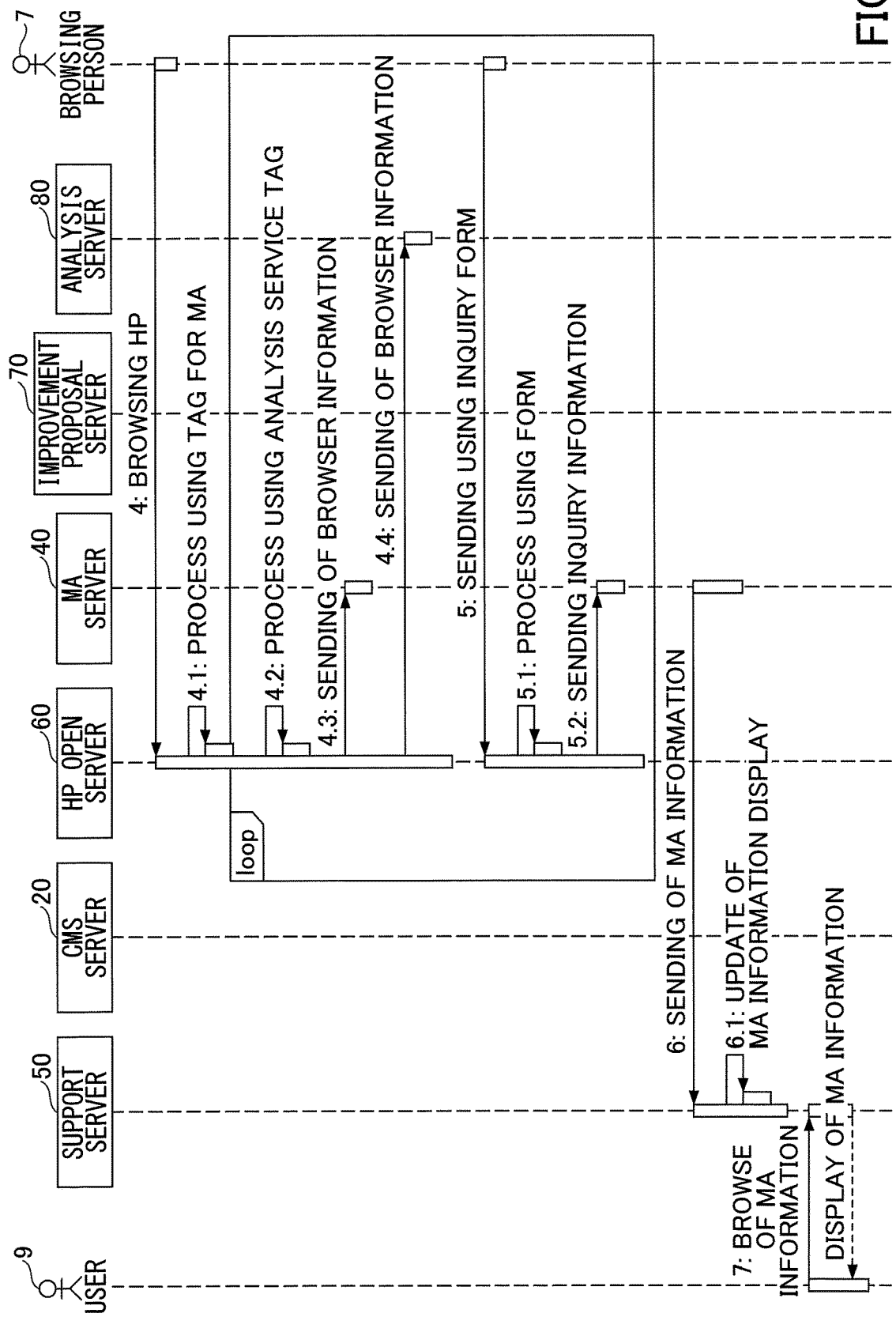
FIG. 26 is a sequence diagram illustrating another example of the procedure from the automatic consulting to the improvement of HP.
Figure 27:
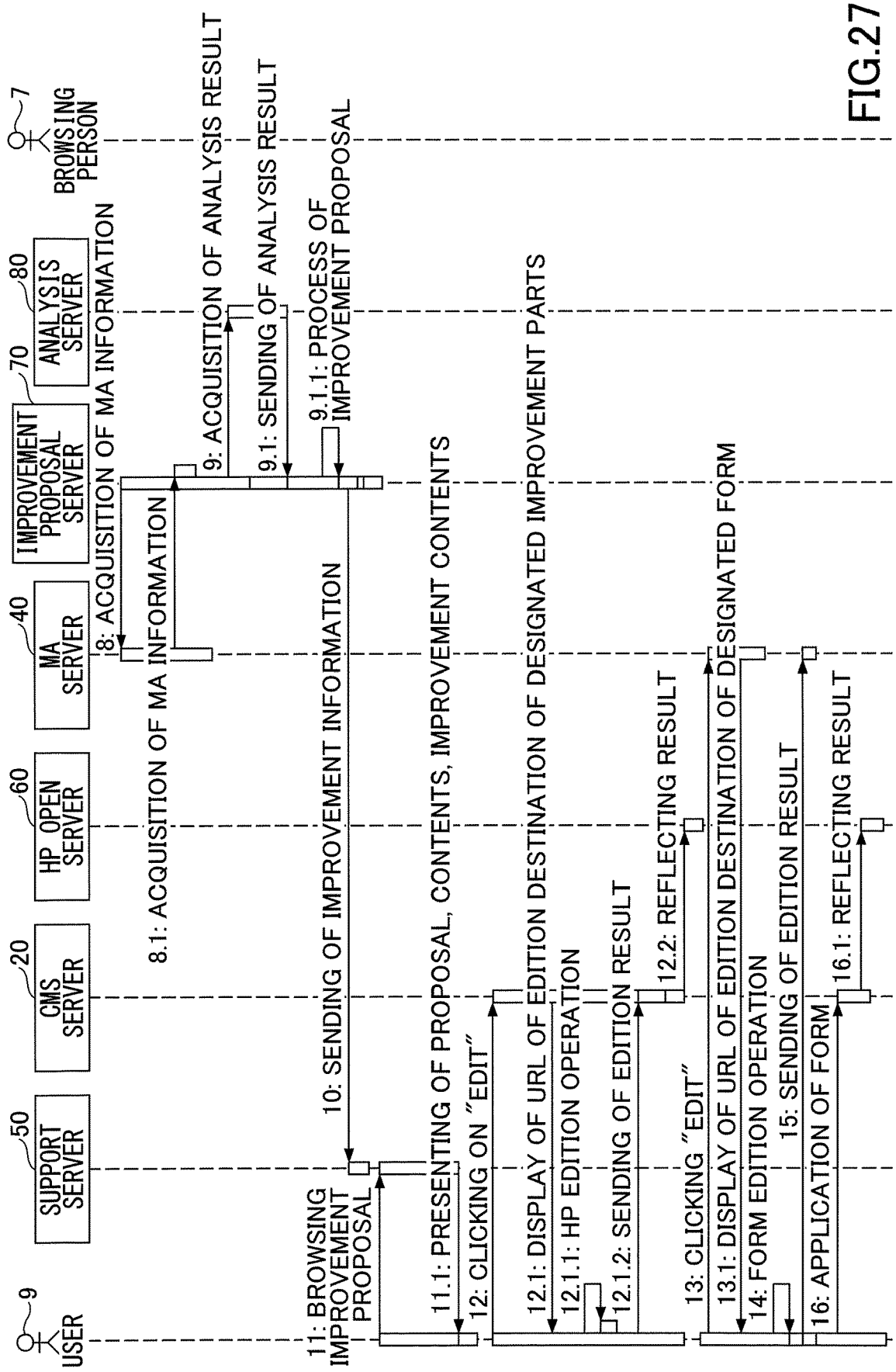
FIG. 27 is a sequence diagram illustrating another example of the procedure from the automatic consulting to the improvement of HP.

FIGS. 25 to 27 are examples of a sequence diagram illustrating a procedure from automatic consulting to improvement of the home page.

S1: The user 9 operates the user terminal 13 to start a communication session with the support server 50. The support server 50 holds the user ID thereof, and the login is performed by a known login method. Accordingly, the user terminal 13 displays the commodity character entry screen 301 as in FIG. 8, the business type selection screen 401 as in FIG. 10, and the web site type selection screen 411. Therefore, the user 9 enters information for automatic consultation. The operation reception unit 22 receives the input of the information for the automatic consulting, and the first communication unit 21 sends the information for the automatic consulting to the support server 50.

S1.1: The second communication unit 31 of the support server 50 receives information for automatic consultation, and the consulting unit 33 creates a parameter for creating a template referring to the parameter conversion DB 5001. That is, create an importance bar of content.

S1.2: Here, the case in which the user uses the form creation web service of the MA server 40. The form creation requesting unit 36 of the support server 50 communicates with the MA server 40 based on the MA identification information stored in the user information DB 5002 through the fourth communication unit 35 and sends the information described in FIG. 17 inputted by the user to the MA server 40 together with the form creation request.

S1.2.1: The sixth communication unit 51 of the MA server 40 receives the form creation request, and the form creation reception unit 54 creates the form and creates the form code illustrated in FIG. 18. The sixth communication unit 51 sends the form code to the support server 50. The form code contains the identification information of the form. The fourth communication unit 35 of the support server 50 receives the form code.

S1.1.1: The third communication unit 32 of the support server 50 sends the template creation parameter, the destination mail address, the user ID, the MA identification information, the analysis server identification information, the improvement proposal server identification information, and the form code to the CMS server 20. The destination information, the user ID, and the MA identification information may be stored in advance by the support server 50, or may be input by the user 9. The third communication unit 32 calls the API for embedding the HTML tag or the MA tag among the plurality of APIs provided by the CMS server 20 and requests the CMS server 20 to embed the HTML tag or the MA tag. On the other hand, when the third communication unit 32 calls the API in which the HTML tag or the MA tag is not embedded, the CMS server 20 is not requested to embed the HTML tag or the MA tag.

S1.1.1.1: The fifth communication unit 41 of the CMS server 20 receives the template creation parameter, the send destination mail address, the user ID, the MA identification information, the analysis server identification information, the improvement proposal server identification information, and the form code (the URL of the destination of editing the form). The HP template creating unit 42 creates the HP template based on the parameter for creating the template. Only one HP template is created for the number of content categories, but can be used as a home page.

S1.1.1.2: When the HP template is created, the tag/form embedding unit 43 embeds the HTML tag to send the inquiry content to the company to which the user 9 belongs and to the MA server 40 (it is not necessary when using the form creation web service). This tag is described in FIG. 16(b). The tag/form embedding unit 43 generates a MA tag based on MA identification information and embeds a MA tag in the HP template. The MA tag is described in FIG. 19(a). The tag/form embedding unit 43 acquires the analysis service tag based on the analysis server identification information and embeds the analysis service tag in the HP template. Analytical service tags are described in FIG. 19(b). In addition, the URL of the home page is specified as the destination of the analysis server identification information stored in the user information DB 5002, and the analysis service tag is acquired. The tag form embedding 43 embeds the form code into the HP template. The form code is described in FIG. 18.

Thus, when the HP template is created, the HP template is stored in the HP storage unit 44. The fifth communication unit 41 of the CMS server 20 sends the URL for HP creation which is a URL in which the HP template is stored in the HP storage unit 44 to the support server 50. A user ID may be sent to identify the user 9. The support server 50 sends the URL for creating the HP to the user terminal 13. The URL for creating the HP contains the URL for editing each page. The CMS server 20 also obtains the URL to which the form is edited from the support server 50.

S2: This allows the user 9 to access the user terminal 13 to the URL for HP creation, display the HP template, and complete the home page by entering images and characters. The operation reception unit 22 receives the images and characters inputted by the user 9 and sets them to the home page. The first communication unit 21 sends the completed home page to the CMS server 20. The HP creation reception unit 45 of the CMS server 20 receives the completed home page through the fifth communication unit 41 and stores it in an HP storage unit 44. The user may log in to the CMS server 20 again, but the information processing system 100 may utilize single sign-on. This allows the user to log in to the support server 50 and also to the CMS server 20.

When the home page is disclosed, the HP information transmission unit 46 of the CMS server 20 sends the HP configuration information, the editing URL of each page, and the editing destination URL of each form to the improvement proposal server 70 based on the improvement proposal server identification information stored in the user information DB 5002. The user ID may be sent so that the source of the HP configuration information can be identified. The home page information reception unit 76 of the improvement proposal server 70 receives the HP configuration information, the editing URL of each page, and the editing destination URL of the form.

S3: The user 9 then performs the work of publishing the home page. HP publication work may be performed using a known method. The user 9 causes the user terminal 13 to communicate with the CMS server 20 and enters an operation to open the HP of the URL for creating the HP. The operation reception unit 22 of the user terminal 13 receives the operation, and the first communication unit 21 sends the HP disclosure request to the CMS server 20. The user ID of the user 9 may be known to the CMS server 20 by single sign-on, or may be input by the user.

S3.1: The fifth communication unit 41 of the CMS server 20 receives the HP disclosure request, and the CMS server 20 deploys the HP of the URL for HP creation to the HP open server 60. The deployment refers to browsing the HP (home page) available. This allows the HP open server 60 to browse the HP. The fifth communication unit 41 of the CMS server 20 notifies the CMS server 20 of the completion of deployment.

S3.2: The fifth communication unit 41 of the CMS server 20 sends the HP disclosure completion notification together with the user ID to the support server 50. The fifth communication unit 41 registers the HP disclosure completion in the user information DB 5002 in accordance with the received user ID. The fifth communication unit 41 of the CMS server 20 sends the disclosure completion notification to the user terminal 13.

In Step S3 to Step S3.2, the user terminal 13 sends the HP disclosure request directly to the CMS server 20, but the user terminal 13 may transmit the HP disclosure request to the support server 50. In this case, the home page is managed with the user ID, and when the user terminal 13 sends the user ID to the support server 50, the support server 50 designates the user ID and sends the HP disclosure request to the CMS server 20.

S4: The browsing person operates the browsing person terminal 14 to browse the HP.

S4.1: Performs processing in which the MA tag embedded in the home page of the HP open server 60 is set to the MA tag. For example, return cookies to count the number of browsing and determine the presence of the CV.

S4.2: Performs processing in which the analysis service tag embedded in the home page of the HP open server 60 is set to the analysis service tag. For example, return cookies to count the number of visits and determine the presence of a CV. Steps S4.2 to S5.2 are executed repeatedly.

S4.3: The MA tag embedded in the home page of the HP open server 60 sends the browsing information and the user ID to the MA server 40. The MA information reception unit 52 of the MA server 40 receives the information and the MA information management unit 53 processes the browsing information to calculate the number of PV and the number of CV per user (for each company).

S4.4: The analysis service tag embedded in the home page of the HP open server 60 sends browsing information and user ID to the analysis server 80. The browsing information reception unit 62 of the analysis server 80 receives the information and the browsing information managing unit 63 processes the browsing information to calculate the number of PVs and the number of CVs per user (for each company).

S5: The browser operates the browsing person terminal 14 to enter inquiry content into the inquiry form.

S5.1: The form embedded in the home page of the HP open server 60 processes the inquiry content entered in the inquiry form into a format such as JSON.

S5.2: The form code embedded in the home page of the HP open server 60 sends the inquiry content to the destination mail address and sends the inquiry content and the user ID to the MA server 40. The MA information reception unit 52 of the MA server 40 receives the information and the MA information management unit 53 manages the information corresponding to the user 9.

S6: The fourth communication unit 35 of the support server 50 periodically communicates with the MA server 40, designates each user 9, and acquires the MA information. The last updated date and time of each user 9 may be sent to the MA server 40. Accordingly, only the difference MA information, such as the MA information after the last update date, can be acquired, and the communication load can be reduced. The MA information associated with the user ID may only be acquired without designating the user 9. In order to notify that the HP disclosure is completed, the fourth communication unit 35 preferably sends the HP disclosure completion flag to the MA server 40. This prevents the MA server 40 from detecting an error of lack of MA information prior to disclosure.

The sixth communication unit 51 of the MA server 40 sends the MA information for each user 9 managed by the MA information management unit 53 to the support server 50. The sixth communication unit 51 receives the request of the MA information only when the HP disclosure completion flag is True. This prevents errors from occurring when a request for MA information about an unpublished HP is received. When the fourth communication unit 35 sends the last update date and time of each user 9 to the MA server 40, the MA information after the last update date and time is transmitted.

S6.1: The fourth communication unit 35 of the support server 50 receives the MA information, and the MA information providing unit 34 generates screen information (HTML, JavaScript (registered trademark), and CSS) for displaying the MA information screen 501 as illustrated in FIG. 21.

In Step S6, the support server 50 requests the MA server 40 with the MA information, but the MA server 40 may transmit the MA information to the support server 50 with PUSH. In this case, the date and time of the last update may be managed by the MA server 40.

S7: The user 9 operates the user terminal 13 to start a communication session with the support server 50 and requests the support server 50 to view the MA information. The login identifies the user 9. The MA information providing unit 34 of the support server 50 sends the MA information identified by the user ID to the user terminal 13. Therefore, the first communication unit 21 of the user terminal 13 receives the screen information of the MA information screen 501, and the display control unit 23 can display the MA information screen 501.

For example, the MA information acquisition unit 73 of the improvement proposal server 70 periodically designates the user ID to the MA server and requests the MA information. When the user requests the support server 50, the MA information acquisition unit 73 of the improvement proposal server 70 may request the MA information. The improvement proposal server 70 acquires the MA information because it performs the same processing as the analysis server 80 independently. For example, it is possible to analyze inquiries. The improvement proposal server 70 does not necessarily acquire the MA information.

S8.1: The MA information management unit 53 of the MA server 40 sends the MA information to the improvement proposal server 70 through the sixth communication unit 51. The MA information acquisition unit 73 of the improvement proposal server 70 acquires the MA information.

S9: The analysis result request unit 74 of the improvement proposal server 70 periodically, for example, designates a user ID to the analysis server 80 and requests the analysis result. When the user requests the support server 50, the analysis result request unit 74 of the improvement proposal server 70 may request the analysis result.

S9.1: The seventh communication unit 61 of the analysis server 80 receives a request for an assay result and sends the assay result analyzed by the analysis unit 64 to the improvement proposal server 70.

S9.1.1: The analysis result reception unit 75 of the improvement proposal server 70 receives the analysis result, and the improvement information creation unit 72 creates the improvement information described in FIGS. 22 and 23 based on the HP configuration information, the MA information, and the analysis result.

S10: The improvement information transmission unit 71 sends the improvement information to the support server 50 designating the user ID. The improvement information reception unit 37 of the support server 50 receives the improvement information. The improvement information is attached with the URL to edit each page, the URL to edit each form, and the URL to view the list of pages with the good CVR and the list of pages with the bad CVR.

The operation reception unit 22 of the user terminal 13 receives this operation. The first communication unit 21 of the user terminal 13 sends a request for improvement proposal to the support server 50. The user 9 has already been identified.

S11.1: The second communication unit 31 of the support server 50 receives a request for improvement proposal and sends the improvement information received by the improvement information reception unit 37 from the improvement proposal server 70 to the user terminal 13. That is, the screen information creation unit 38 generates the screen information of the improvement proposal screen of FIG. 24 and sends the information to the user terminal 13. In addition to the improvement information, the "edit" buttons 514, 517 and 520, the "view of pages with the good CVR" button 515 and the "view of pages with the bad CVR" button 518 are displayed. The "edit" buttons 514 and 517 embed the URL where the page is edited, and the "edit" button 520 embedded the URL to edit the form. Button 515 for "view of the page with the good CVR" and button 518 for "view of the page with the bad CVR" embed URLs for listing these. The first communication unit 21 of the user terminal 13 receives the screen information of the improvement proposal screen, and the display control unit 23 displays the improvement proposal screen.

S12: The user 9 operates the user terminal 13 and clicks "edit" buttons 514 and 517 of, for example, the HP configuration field 511 on the improvement proposal screen. Because the URL of the page editor is embedded in the "edit" buttons 514 and 517, when the operation reception unit 22 receives the clicking of the "edit" buttons 514 and 517, the first communication unit 21 communicates with the CMS server 20 that is the page editor.

S12.1: The fifth communication unit 41 of the CMS server 20 accepts communication, and the HP creation reception unit 45 designates screen information of the page designated by the URL for editing and creates screen information of the screen on which screen information is edited. The fifth communication unit 41 sends screen information of the screen for editing screen information of the designated page to the user terminal 13.

S12.1.1: The first communication unit 21 of the user terminal 13 receives screen information of a screen for editing screen information of a designated page, and the display control unit 23 displays the screen information. The user edits the page according to the improvement information. The operation reception unit 22 accepts the edit.

S12.1.2: The first communication unit 21 of the user terminal 13 sends screen information of the edited page together with the user ID to the CMS server 20. Each page is identified by a URL.

S12.2: The fifth communication unit 41 of the CMS server 20 receives the screen information of the edited page, and the HP creation reception unit 45 reflects the screen information of the received page on the page identified by the URL on the user's home page identified by the user ID.

S13: The user 9 then operates the user terminal 13 and clicks the "edit" button 520 of, for example, the form field 512 of the improvement proposal screen. Because the "edit" button 520 embeds the form identification information and the URL of the form to be edited, when the operation reception unit 22 receives the clicking of the "edit" button 520, the first communication unit 21 communicates with the MA server 40, which is the form to be edited. The form may be edited before the home page configuration is edited.

S13.1: The sixth communication unit 51 of the MA server 40 accepts the communication, and the form creation reception unit 54 designates the screen information of the form designated by the URL for editing and creates the screen information of the screen for editing the screen information. The sixth communication unit 51 sends screen information of the screen for editing screen information of the designated form to the user terminal 13.

S14: The first communication unit 21 of the user terminal 13 receives screen information of a screen for editing screen information of a designated form, and the display control unit 23 displays the screen information. The user edits the form according to the improvement information. The operation reception unit 22 accepts the edit.

S15: The first communication unit 21 of the user terminal 13 sends the screen information of the edited form to the MA server 40. Upon editing, the user terminal 13 receives a new form code. The form identification information contained in the form code is the same form and is unchanged.

S16: The user enters an operation to apply the edited form (paste the form code into the home page) to the user terminal 13. The operation reception unit 22 of the user terminal 13 receives this operation, and the first communication unit 21 requests the CMS server 20 to apply the form together with the user ID and the form code (sends the form code).

S16.1: The fifth communication unit 41 of the CMS server 20 receives the form code, and the HP creation reception unit 45 updates the original form code specified by the form identification information included in the form code with the submitted form code on the home page specified by the user ID.

SUMMARY

As described above, because the improvement proposal server 70 generates the improvement information from the analysis results, the information processing system according to the present embodiment can improve the home page effective for lead generation even if the user is not necessarily familiar with the digital marketing technology. The improvement proposal screen embeds the URL of the page or form to be edited, so the user can easily edit the home page or URL according to the Improvement Information.

OTHER APPLICATIONS

While the preferred embodiment of the present invention has been described with reference to examples, various modifications and substitutions may be made thereto without departing from the spirit and scope of the invention.

For example, although the inquiry content have been described as being sent to the user and MA server 40, the inquiry content may be further sent to another party. The HP open server 60 may transmit the information entered by the browsing person to the user and the MA server 40 as well as the inquiry contents.

Further, although the user has explained that the functions of the CMS server 20, the MA server 40, and the analysis server 80 can be utilized from the support server 50, the user terminal 13 may communicate directly with the CMS server 20, the MA server 40, or the analysis server 80.

Further, there may be a plurality of support servers 50, and the functions of the support servers 50 may be distributed among a plurality of servers.

Further, a configuration example such as FIG. 7 is divided according to a main function in order to facilitate understanding of processing by the support server 50, the CMS server 20, the MA server 40, the analysis server 80, and the improvement proposal server 70. The invention of the present application is not limited by the method of dividing the processing unit or by the name. The processing of the support server 50, the CMS server 20, the MA server 40, the analysis server 80, and the improvement proposal server 70 may be divided into more processing units depending on the processing contents. Alternatively, one processing unit can be divided to include more processing.

The functions of the embodiments described above may be implemented by one or more processing circuits. As used herein, a "processing circuit" includes a processor programmed to perform each function by software, such as a processor implemented in electronic circuits, an ASIC (Application Specific Integrated Circuit) designed to perform each function as described above, a digital signal processor (DSP), a field programmable gate array (FPGA), or a conventional circuit module.

Effects of the Invention

It is possible to provide an information processing system that can propose improved information on a website can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention.

Although the information processing system has been described in detail, it should be understood that various changes, substitutions, and alterations could be made thereto without departing from the spirit and scope of the invention.

Explanations of numerical references are as follows:
13: User terminal;
14: Browsing person terminal;
20: CMS server;
40: MA server;
50: Support server;
60: HP open server;
70: Analysis server;
80: Improvement proposal server; and
100: Information processing system.

What is claimed is:

1. An information processing system comprising a processor that is configured to:
    at least one information processing apparatus that communicate with a first service for supporting to create a home page and a second service for creating an analysis result by analyzing information related to browsing of the home page via a network; and
    a processor that is configured to:
        receive home page configuration information concerning a configuration of the home page from the first service;
        receive the analysis result from the second service;
        create improvement information for improving the home page based on the home page configuration information and the analysis result;
        identify a page based on identification information of each page included in the home page configuration information;
        receive browsing information related to an inspection of the page from a third service, said browsing information including identification information of a browsing person who has accessed the page having an inquiry form, time information indicative of an accessed time, and time information indicative of a time when content of the inquiry form is sent to the information processing system;
        determine whether a goal expected by the page is achieved by determining that a difference between the time information indicative of the accessed time for the same browsing person judged based on the identification information of the browsing person and the time information indicative of the time when the content of the inquiry form is sent to the information processing system exceeds a predetermined threshold value;
        obtain a CVR (Conversion Rate) based on a number of accesses per one page and a number of times the goal is achieved; and
        send, as a second communication unit, to a user terminal operated by a user, the created improvement information and the CVR (Conversion Rate) with respect to the page included in the home page configuration information together with information indicating whether the CVR (Conversion Rate) is not less than or is less than a threshold value.

2. The information processing system according to claim 1,
    wherein the improvement information for improving the home page is provided to the user terminal separately as information for changing the configuration of the home page and information for changing a form entered by the browsing person.

3. The information processing system according to claim 1,
   wherein the analysis result is analyzed for each page included in the home page configuration information,
   wherein the home page configuration information includes the identification information of each page included in the home page, and
   wherein the improvement information for improving the home page is created for each page included in the home page.

4. The information processing system according to claim 3,
   wherein the improvement information is information that strengthens a guidance to a predetermined page included in the analysis result received from the second service.

5. The information processing system according to claim 4,
   wherein the improvement information is information contained in the analysis result received from the second service, and
   wherein the improvement information strengthens a guidance to the predetermined page from an entrance page firstly browsed by the browsing person of the home page.

6. The information processing system according to claim 4, wherein the processor is further configured to:
   create screen information of an improvement proposal screen for displaying the improvement information by the user terminal; and
   cause an edition destination URL of the home page acquired from the first service to be included in the screen information of the improvement proposal screen.

7. The information processing system according to claim 6,
   wherein the edition destination URL for editing a page to be improved is embedded in a display part of the improvement proposal screen.

8. The information processing system according to claim 3,
   wherein the improvement information weakens the guidance to the predetermined page included in the analysis result received from the second service.

9. The information processing system according to claim 8,
   wherein the improvement information is information included in the analysis result received from the second service that weakens the guidance by the browsing person to the predetermined page from the entrance page first viewed by the browsing person to the home page.

10. The information processing system according to claim 1,
    wherein the analysis result is analyzed for each form stored by the home page and to be entered by a browsing person,
    wherein the home page configuration information includes identification information of each form included in the home page, and
    wherein the improvement information is created for each form included in the home page.

11. The information processing system according to claim 10,
    wherein the improvement information is information that changes a number of items of the form included in the analysis result received from the second service.

12. The information processing system according to claim 10, wherein the processor is further configured to:
    create screen information of an improvement proposal screen for displaying the improvement information by the user terminal; and
    cause an edition destination URL of the form obtained from the first service to be included in the screen information of the improvement proposal screen.

13. The information processing system according to claim 12,
    wherein an edition destination URL for editing a form to be improved is embedded in a display component of the improvement proposal screen.

14. An information processing method performed by an information processing system including a first service for supporting to create a home page, a second service for creating an analysis result by analyzing information related to browsing of the home page, and at least one information processing apparatus for communicating via a network, the information processing method comprising:
    receiving home page configuration information concerning a configuration of the home page from the first service;
    receiving the analysis result from the second service;
    creating, by an improvement information creation unit, improvement information for improving the home page based on the home page configuration information and the analysis result;
    identifying a page based on identification information of each page included in the home page configuration information;
    receiving browsing information related to an inspection of the page from a third service, said browsing information including identification information of a browsing person who has accessed the page having an inquiry form, time information indicative of an accessed time, and time information indicative of a time when content of the inquiry form is sent to the information processing system;
    determining whether a goal expected by the page is achieved by determining that a difference between the time information indicative of the accessed time for the same browsing person judged based on the identification information of the browsing person and the time information indicative of the time when the content of the inquiry form is sent to the information processing system exceeds a predetermined threshold value;
    obtaining a CVR (Conversion Rate) based on a number of accesses per one page and a number of times the goal is achieved; and
    sending, to a user terminal operated by a user, the created improvement information and the CVR (Conversion Rate) with respect to the page included in the home page configuration information together with information indicating whether the CVR (Conversion Rate) is not less than or is less than a threshold value.

15. A non-transitory computer-readable storage medium storing a program implemented by a computer included in at least one information processing apparatus that communicates with a first service for supporting to create a home page and a second service for creating an analysis result by analyzing information related to browsing of the home page via a network, the program configured to cause the processor to:

receive home page configuration information concerning a configuration of the home page from the first service;

receive the analysis result from the second service;

create improvement information for improving the home page based on the home page configuration information and the analysis result;

identify a page based on identification information of each page included in the home page configuration information;

receive browsing information related to an inspection of the page from a third service, said browsing information including identification information of a browsing person who has accessed the page having an inquiry form, time information indicative of an accessed time, and time information indicative of a time when content of the inquiry form is sent to the information processing system;

determine whether a goal expected by the page is achieved by determining that a difference between the time information indicative of the accessed time for the same browsing person judged based on the identification information of the browsing person and the time information indicative of the time when the content of the inquiry form is sent to the information processing system exceeds a predetermined threshold value;

obtain a CVR (Conversion Rate) based on a number of accesses per one page and a number of times the goal is achieved; and send, to a user terminal operated by a user, the created improvement information and the CVR (Conversion Rate) with respect to the page included in the home page configuration information together with information indicating whether the CVR (Conversion Rate) is not less than or is less than a threshold value.

* * * * *